United States Patent
Fujiwara et al.

(10) Patent No.: US 7,990,473 B2
(45) Date of Patent: Aug. 2, 2011

(54) IMAGE PROCESSING APPARATUS, IMAGE PROCESSING METHOD, AND IMAGE PROCESSING PROGRAM

(75) Inventors: Nobuyuki Fujiwara, Kanagawa (JP); Hiroshige Okamoto, Kanagawa (JP); Tsutomu Seki, Chiba (JP); Noboru Murabayashi, Saitama (JP); Hideaki Okamura, Tokyo (JP)

(73) Assignee: Sony Corporation (JP)

( * ) Notice: Subject to any disclaimer, the term of this patent is extended or adjusted under 35 U.S.C. 154(b) by 1118 days.

(21) Appl. No.: 11/488,871

(22) Filed: Jul. 18, 2006

(65) Prior Publication Data

US 2007/0024753 A1  Feb. 1, 2007

(30) Foreign Application Priority Data

Jul. 19, 2005 (JP) ................. P2005-208839

(51) Int. Cl.
*H04N 5/45* (2011.01)
(52) U.S. Cl. ................................... 348/565
(58) Field of Classification Search .......... 348/563–566, 348/569, 570; 345/629, 638
See application file for complete search history.

(56) References Cited

U.S. PATENT DOCUMENTS

| | | | |
|---|---|---|---|
| 4,729,027 A | | 3/1988 | Hakamada et al. |
| 5,721,593 A | | 2/1998 | Suh et al. |
| 5,754,253 A | * | 5/1998 | Lee .................. 348/565 |
| 5,978,046 A | * | 11/1999 | Shintani ............. 348/589 |
| 6,384,868 B1 | * | 5/2002 | Oguma ............... 348/564 |
| 6,449,018 B1 | * | 9/2002 | Yokoyama ........... 348/565 |
| 6,795,125 B2 | * | 9/2004 | Yui ................... 348/564 |
| 7,113,224 B2 | * | 9/2006 | Inoue et al. ........ 348/565 |
| 7,253,843 B2 | * | 8/2007 | Lee .................. 348/565 |
| 2005/0113143 A1 | | 5/2005 | Oiwa |
| 2005/0143137 A1 | * | 6/2005 | Matsunaga et al. ... 455/566 |

FOREIGN PATENT DOCUMENTS

| | | |
|---|---|---|
| JP | 06105245 A | 4/1994 |
| JP | 07015683 A | 1/1995 |
| JP | 2000152120 A | 5/2000 |
| JP | 2002077780 A | 3/2002 |
| JP | 2003134415 A | 5/2003 |
| JP | 2003169274 A | 6/2003 |
| JP | 2003298972 A | 10/2003 |

OTHER PUBLICATIONS

Office Action from Japanese Application No. 2005-208839, dated Feb. 22, 2011.

* cited by examiner

*Primary Examiner* — Paulos M Natnael
(74) *Attorney, Agent, or Firm* — Lerner, David, Littenberg, Krumholz & Mentlik, LLP

(57) ABSTRACT

An image processing apparatus that can display a predetermined content as a predetermined main screen or predetermined sub-screens includes a displaying unit operable to display a main-content on the main screen and sub-contents on the sub-screens; a detecting unit operable to detect characteristic amounts of the sub-contents displayed on the sub-screens; and a control unit operable to switch the display on the main screen based on the characteristic amounts of the sub-contents detected by the detecting unit.

16 Claims, 37 Drawing Sheets

IMAGE PROCESSING APPARATUS, IMAGE PROCESSING METHOD, AND IMAGE PROCESSING PROGRAM

CROSS-REFERENCE TO RELATED APPLICATIONS

This application claims priority from Japanese Patent Application No. JP 2005-208839 filed on Jul. 19, 2005, the disclosure of which is hereby incorporated by reference herein.

BACKGROUND OF THE INVENTION

The present invention relates to an image processing apparatus, an image processing method, and an image processing program, and, more particularly to an image processing apparatus, an image processing method, and an image processing program that make it possible to switch, concerning contents multiply displayed on a main screen and sub-screens, display of the content on the main screen on the basis of a characteristic amount of the contents displayed on the sub-screens.

Apparatuses, for example, television receivers that can multiply display plural contents on a main screen and sub-screens have been developed.

However, a technique for switching display on the main screen according to a characteristic amount of contents displayed on the sub-screens, for example, displaying the contents displayed on the sub-screens on the main screen according to a predetermined characteristic amount of the content has not been developed.

The present invention is made in view of the above mentioned problems.

Therefore, it is desirable to make it possible to, for example, switch display on the main screen according to a characteristic amount of contents displayed on the sub-screens.

SUMMARY OF THE INVENTION

According to an embodiment of the invention, there is provided an image processing apparatus including a displaying unit that displays main-content on a main screen and sub-contents on sub-screens; a detecting unit that detects characteristic amounts of the sub-contents displayed on the sub-screens; and a control unit that switches the display on the main screen based on the characteristic amounts of the sub-contents detected by the detecting unit.

When the characteristic amounts of the sub-contents exceed a predetermined threshold, the control unit can display the sub-contents instead of the main content.

The characteristic amounts may be volumes of sounds or magnitudes of sound signals at a predetermined frequency of the sub-contents or degrees of matching of videos of the sub-contents and a predetermined image.

The control unit can return the display on the main screen to the main content when a predetermined condition is satisfied.

The control unit may include a reproducing unit that reproduces the main content, and when reproduction of the main content is stopped and an end time of the main content is determined, the reproducing unit may reproduce the main content such that the reproduction is completed by the end time.

When the characteristic amounts of the sub-contents exceed the predetermined threshold, the control unit can display the sub-contents from a scene a predetermined time earlier than a scene in which the characteristic amounts of the sub-contents exceeding the predetermined threshold is detected.

The control unit can limit switching of the display on the main screen until a characteristic state of the sub-contents displayed on the main-screen ends.

The control unit can reverse and display a video of the sub-contents on the main screen.

When the characteristic amounts of the sub-contents exceeding the predetermined threshold are simultaneously detected from plural sub-contents, the control unit can display all or a part of the plural sub-contents on the main screen.

The control unit can change the display of the sub-contents displayed on the main screen according to a transition of the characteristic amounts.

It is possible to further provide a recording unit that records the sub-contents displayed on the sub-screens.

The main content may be a broadcast program or game content.

The image processing apparatus may further include a sound outputting unit that outputs sound of the main content displayed on the main screen and sounds of the sub-contents displayed on the sub-screens. The control unit can control the sound outputting unit based on the characteristic amounts of the sub-contents detected by the detecting unit.

According to another embodiment of the invention, there is provided an image processing method including displaying a main content on a main screen and displaying sub-contents on sub-screens; detecting characteristic amounts of the sub-contents displayed on the sub-screens; and switching the display on the main screen based on the characteristic amounts of the sub-screens detected.

According to still another embodiment of the invention, there is provided a program for causing a computer to execute a process including displaying a main content on a main screen and displaying sub-contents on sub-screens; detecting characteristic amounts of the sub-contents displayed on the sub-screens; and switching the display on the main screen based on the characteristic amounts of the sub-contents detected.

In the embodiments of the invention, a main content is displayed on the main screen, sub-contents are displayed on the sub-screens, characteristic amounts of the sub-contents displayed on the sub-screens are detected, and the display on the main screen is switched based on the characteristic amounts of the sub-contents detected.

DETAILED DESCRIPTION

Figure 1:
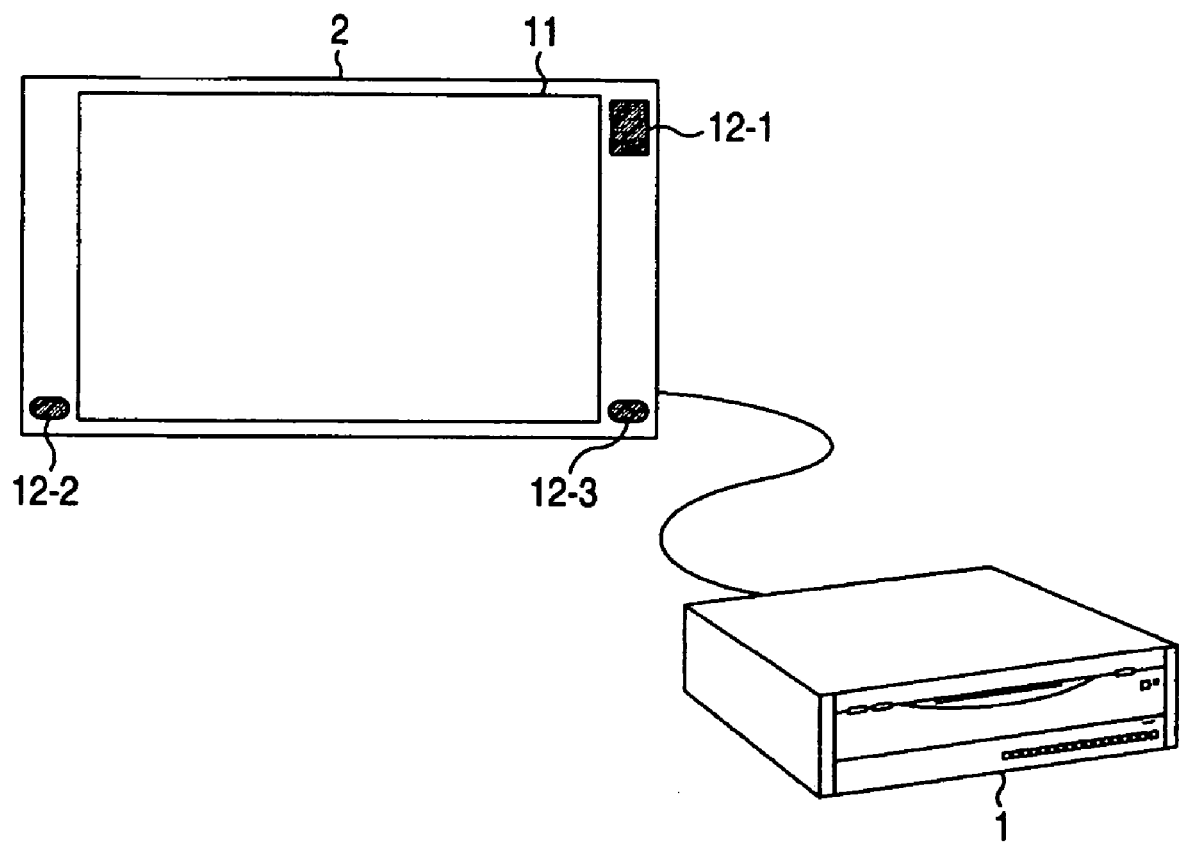
FIG. 1 is a diagram showing an example of use of an image processing apparatus 1 according to an embodiment of the invention.

Embodiments of the invention will be hereinafter explained. An example of a correspondence relation between elements of the invention and embodiments described in the following detailed description of the invention is as described below. This description is made for the purpose of confirming that the embodiments supporting the invention are described in the detailed description of the invention. Therefore, even if there is an embodiment described in the detailed description of the invention but not described below as an embodiment corresponding to an element of the invention, this does not mean that the embodiment does not correspond to the element. On the other hand, even if an embodiment is described as an embodiment corresponding to an element of the invention, this does not means that the embodiment does not correspond to elements other than the element.

An image processing apparatus according to an embodiment of the invention, includes a displaying unit (e.g., a display control unit 206 in FIG. 6) that displays a main content (e.g., content M in FIG. 2) on the main screen (e.g., a main screen 21 in FIG. 2) and displays sub-contents (e.g., contents C in FIG. 2) on the sub-screens (e.g., sub-screens 22 in FIG. 2), a detecting unit (e.g., a characteristic amount extracting unit 203 in FIG. 6) that detects characteristic amounts of the sub-contents displayed on the sub-screens, and a control unit (e.g., a control unit 204 in FIG. 6) that switches the display on the main screen on the basis of the characteristic amounts detected by the detecting unit.

Figure 3:
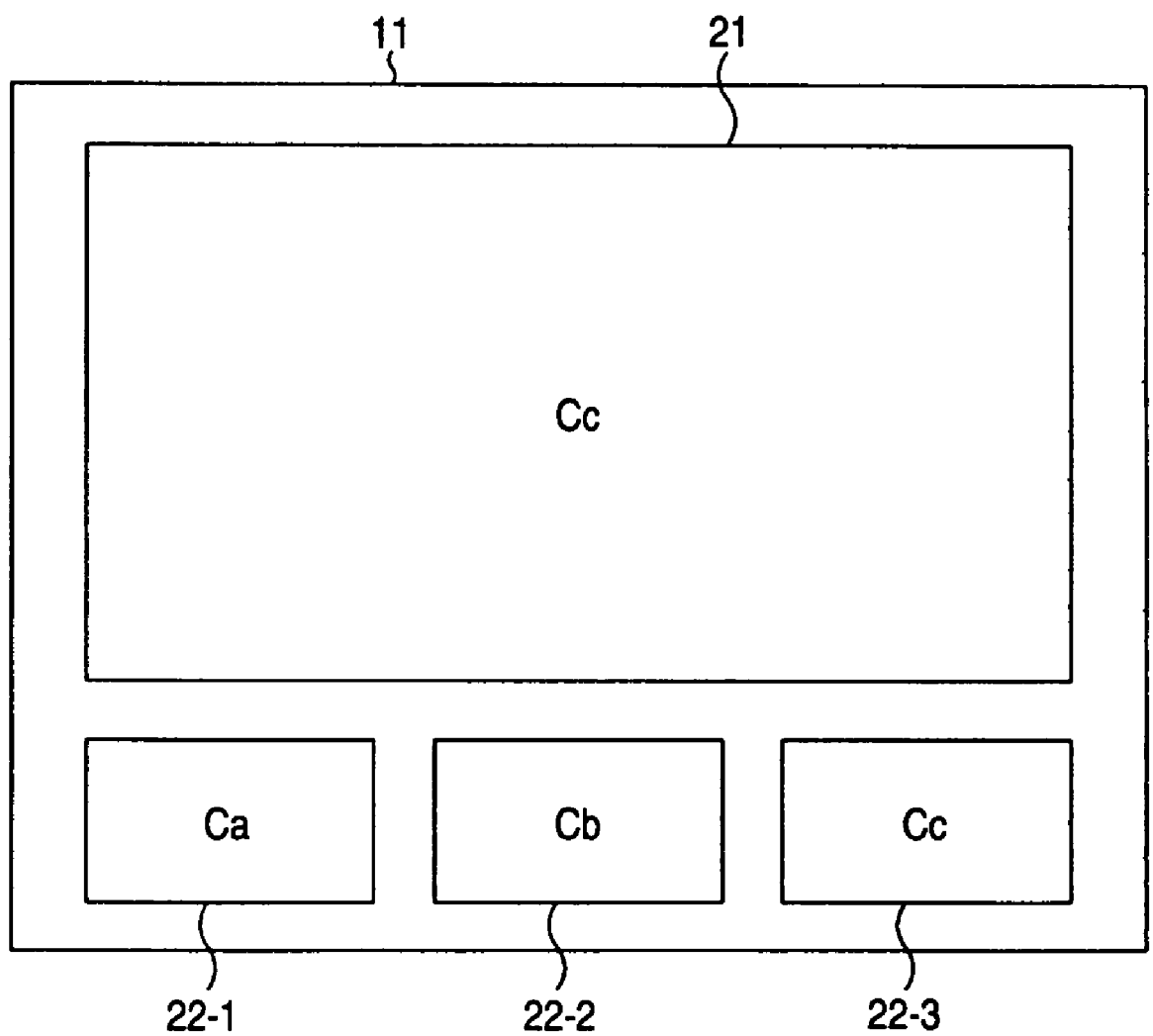
FIG. 3 is a diagram showing another example of display on the displaying unit 11 of the TV 2 in FIG. 1.

In an image processing apparatus according to another embodiment of the invention, the control unit displays the sub-content, in which the characteristic amount exceeding a predetermined threshold is obtained, on the main screen instead of the main content (see, for example, FIG. 3).

In an image processing apparatus according to still another embodiment of the invention, the characteristic amounts are volumes of sounds or magnitudes of sound signals at a predetermined frequency of the sub-contents (see, for example, B in FIG. 8) or degrees of matching of videos of the sub-contents and a predetermined image.

Figure 10:
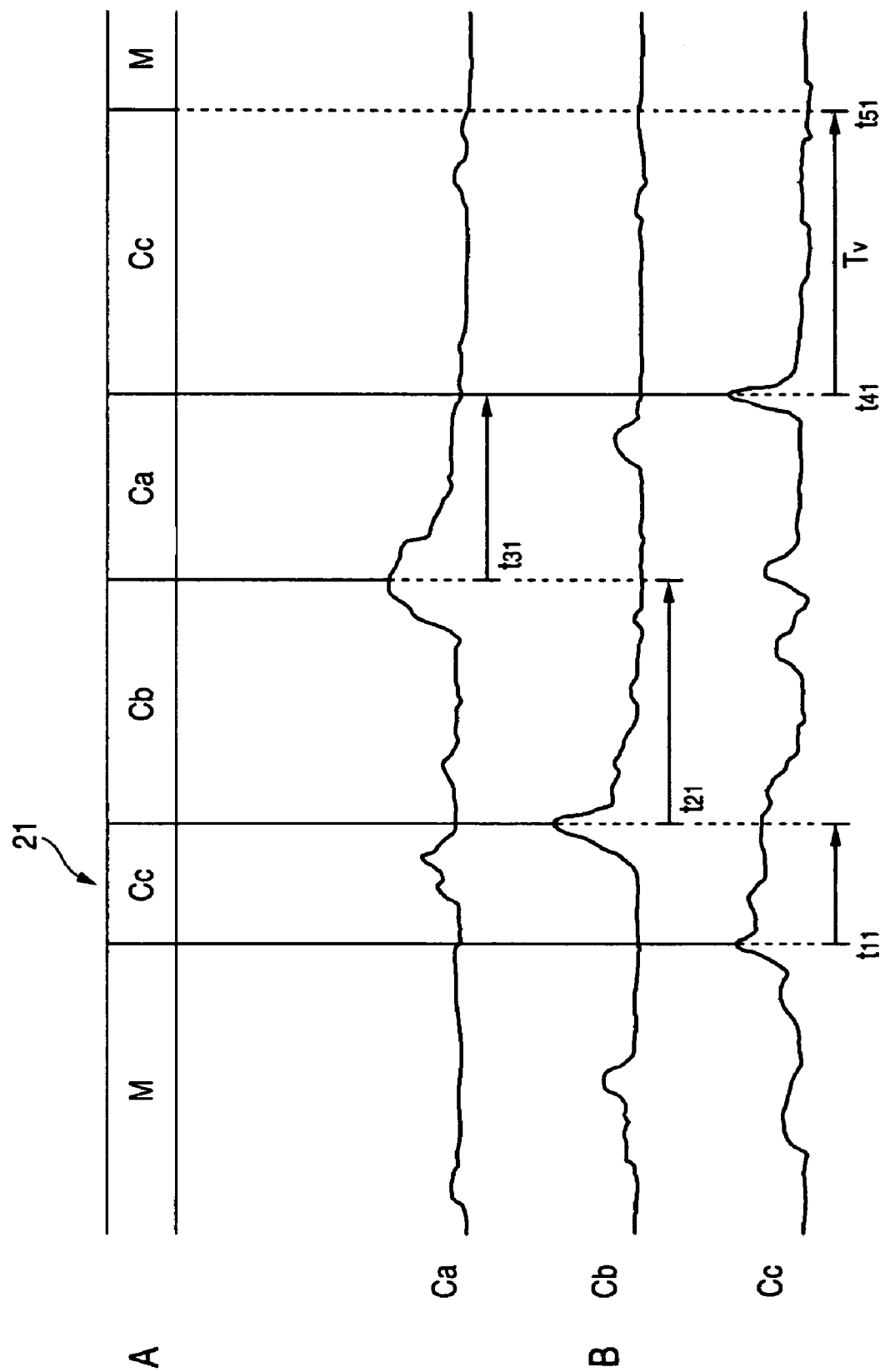
FIG. 10 is another diagram for explaining the display switching processing.

In an image processing apparatus according to still another embodiment of the invention, the control unit returns the display on the main screen to the main content when a predetermined condition is satisfied (see, for example, FIG. 10).

Figure 11:
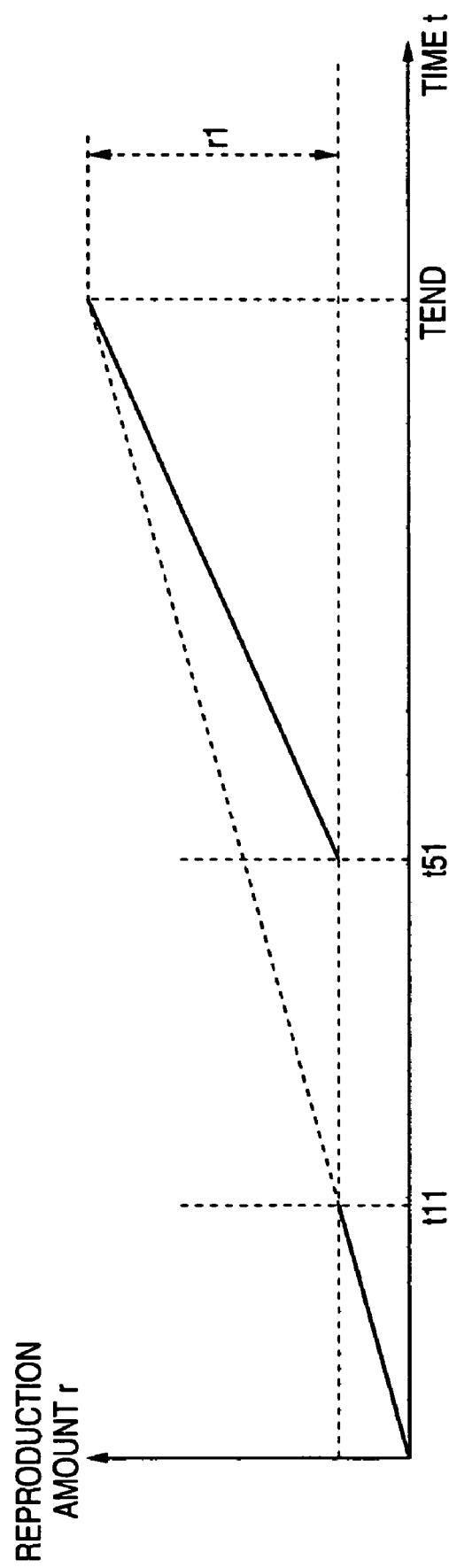
FIG. 11 is a diagram for explaining special reproduction.
Figure 12:
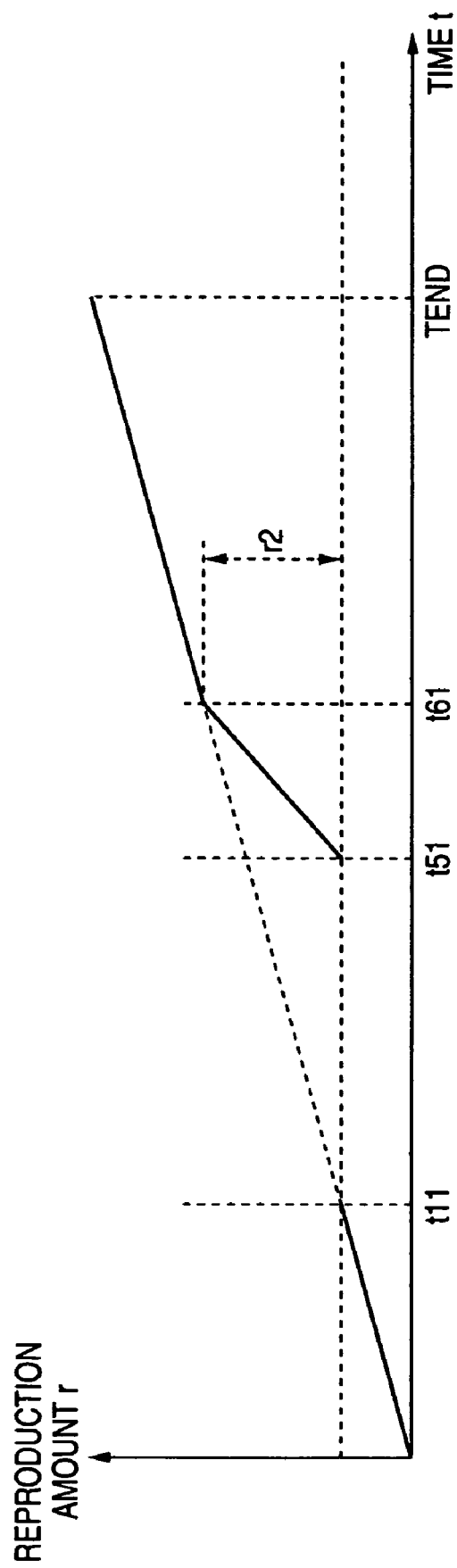
FIG. 12 is a diagram for explaining the special reproduction.

In the case in which reproduction of the main content is stopped and an end time of the main content is determined, the control unit further includes a reproducing unit (e.g., a reproducing unit 202 in FIG. 6) that reproduces the main content such that the reproduction is completed by the end time (see, for example, FIGS. 11 and 12).

Figure 14:
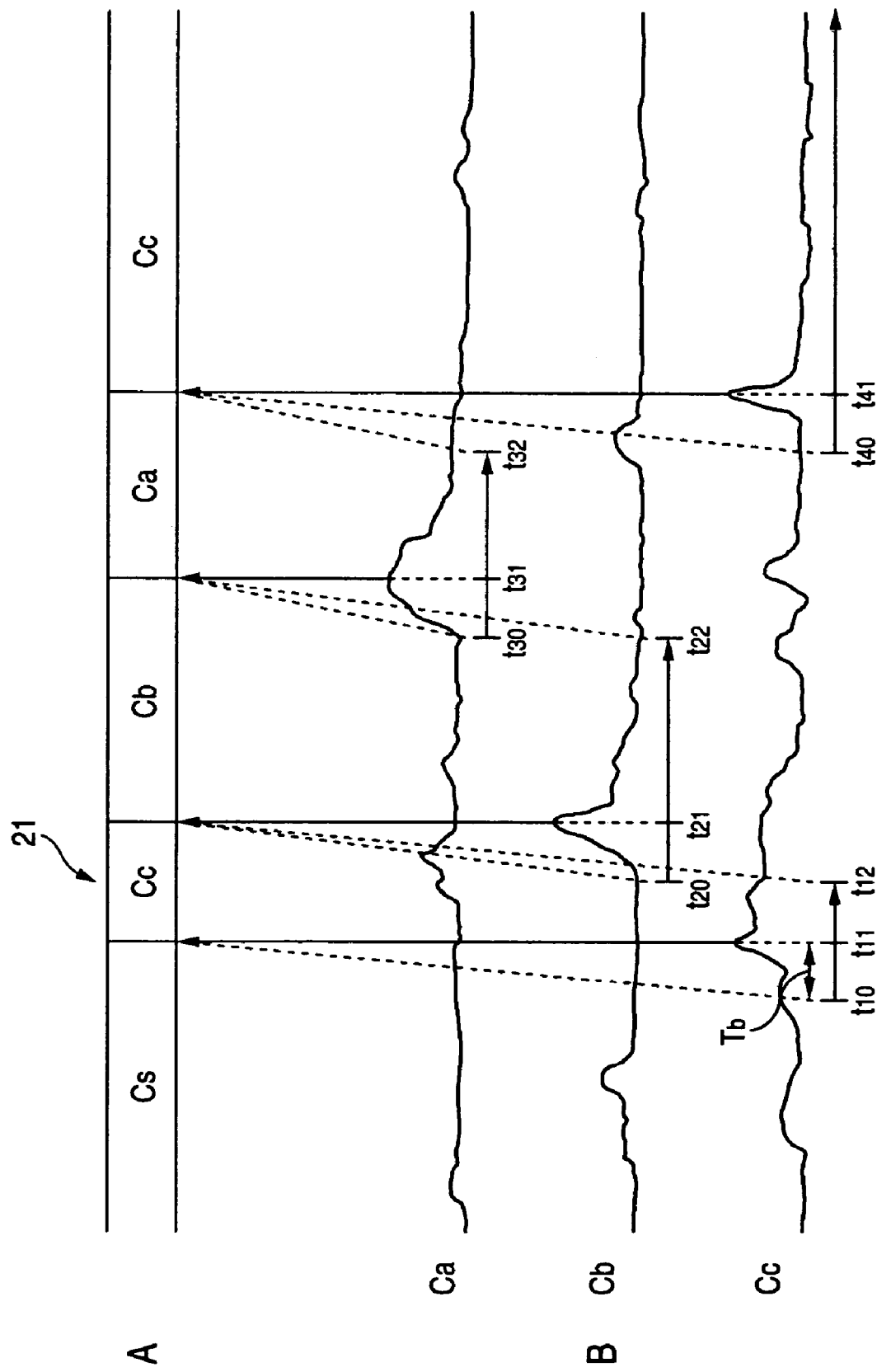
FIG. 14 is still another diagram for explaining the display switching processing.

In an image processing apparatus according to still another embodiment of the invention, the control unit displays, when the characteristic amount exceeding the threshold is detected, the sub-content from a scene a predetermined time earlier than a scene in which the characteristic amount exceeding the threshold is detected (see, for example, FIG. 14).

Figure 15:
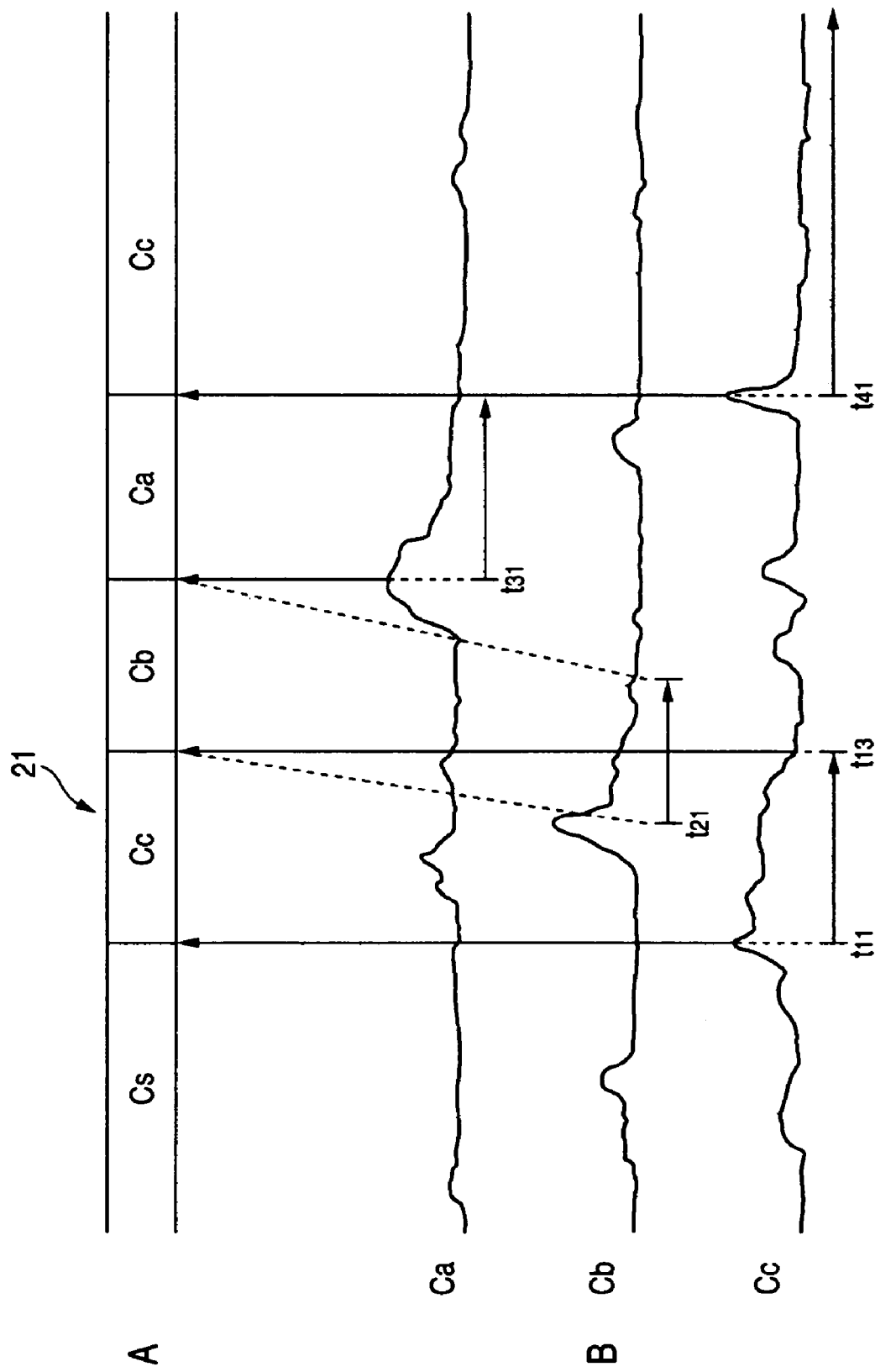
FIG. 15 is still another diagram for explaining the display switching processing.

In an image processing apparatus according to still another embodiment of the invention, the control unit limits switching of the display on the main screen until a characteristic state of the sub-content displayed on the main screen ends (see, for example, FIG. 15).

Figure 29:
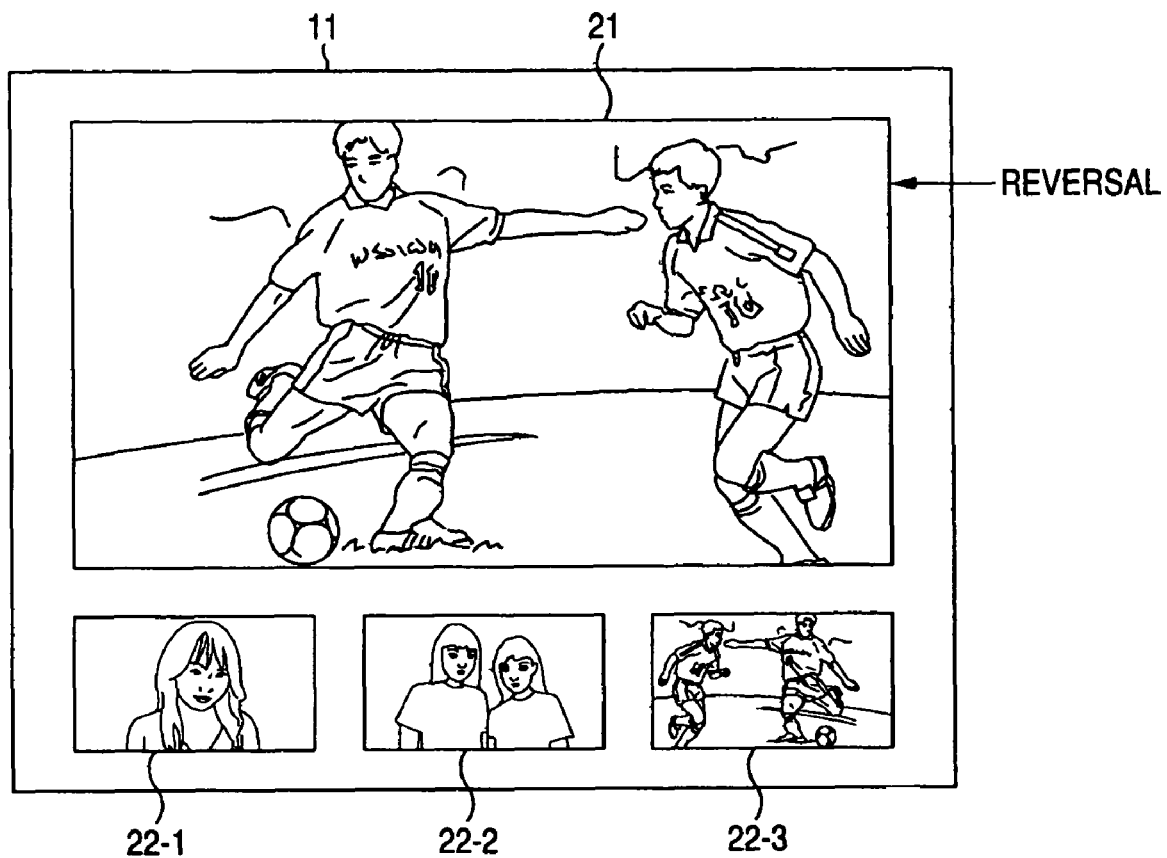
FIG. 29 is a diagram showing still another example of display on the displaying unit 11 of the TV 2 in FIG. 1.
Figure 30:
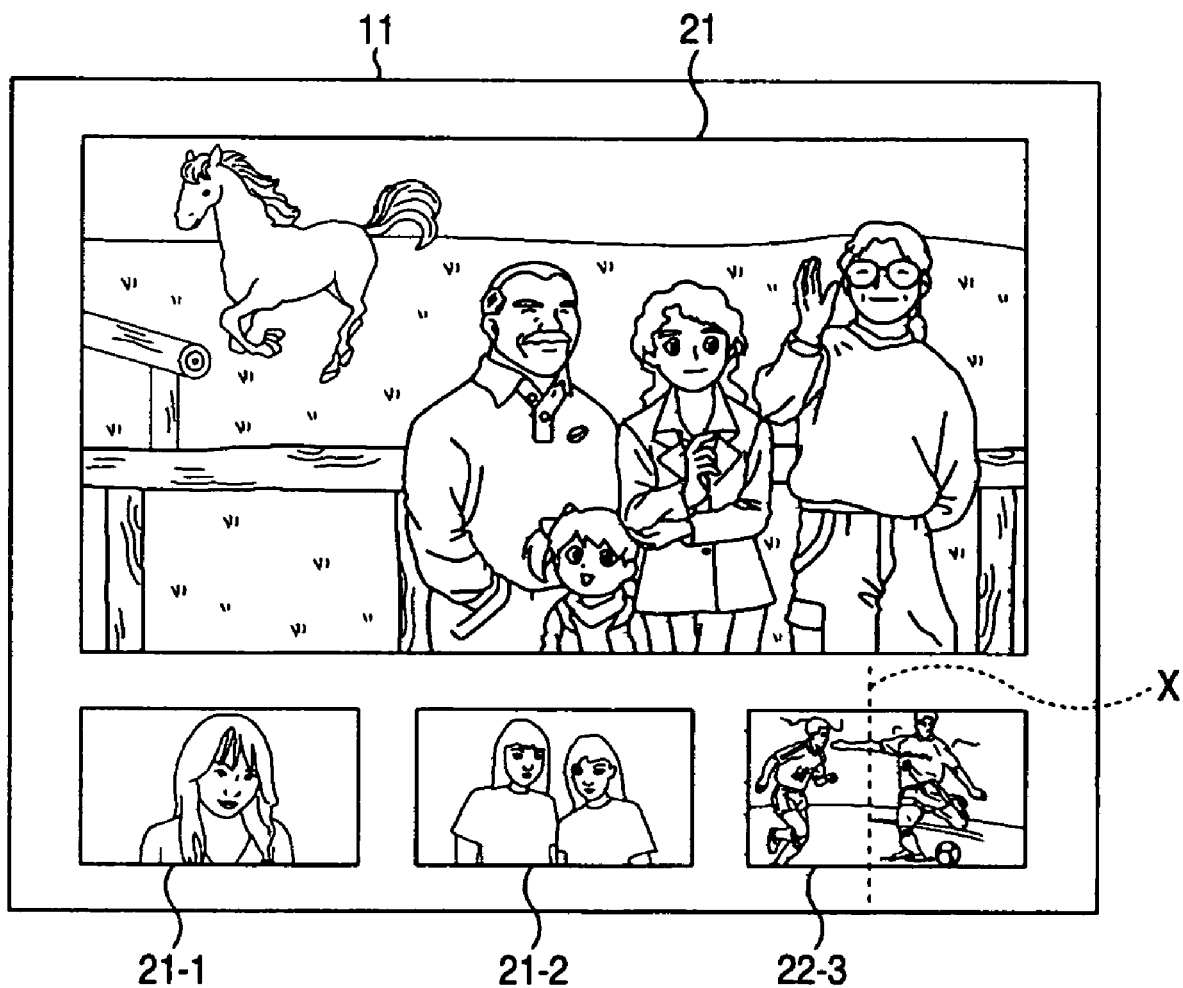
FIG. 30 is a diagram showing still another example of display on the displaying unit 11 of the TV 2 in FIG. 1.
Figure 31:
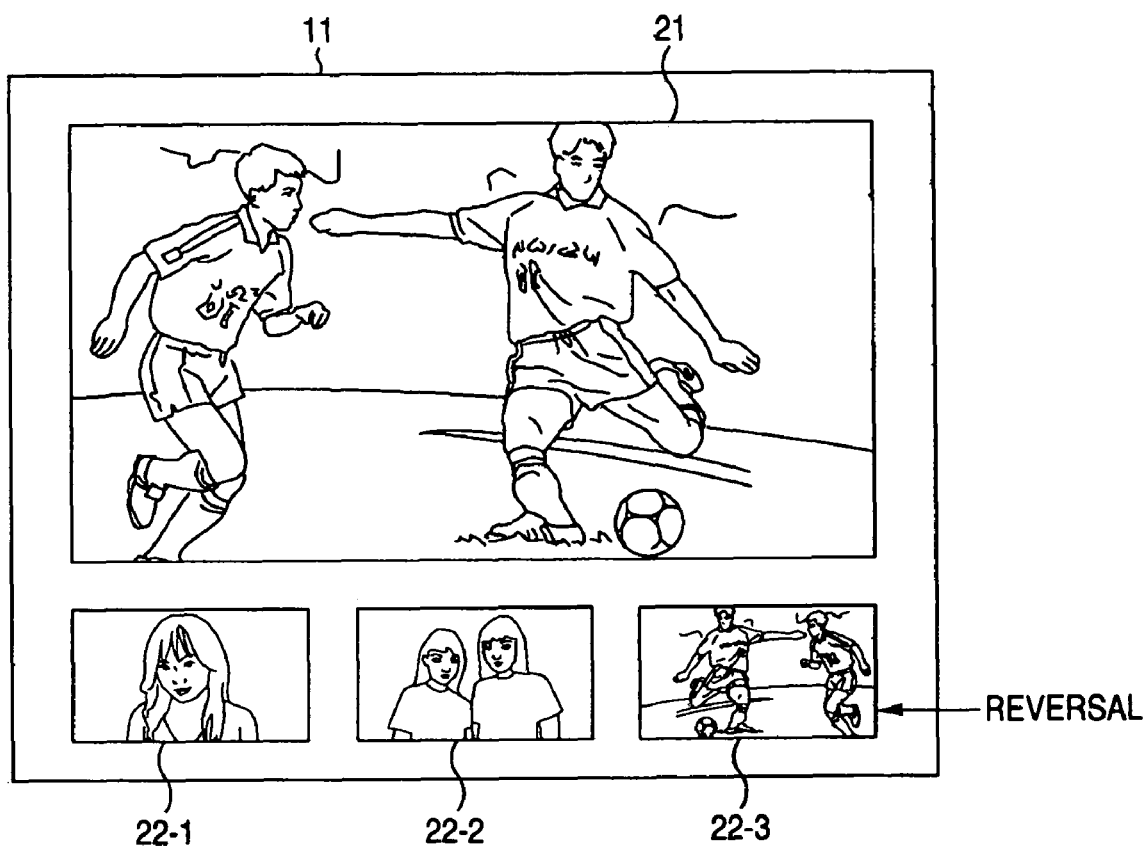
FIG. 31 is a diagram showing still another example of display on the displaying unit 11 of the TV 2 in FIG. 1.

In an image processing apparatus according to still another embodiment of the invention, the control unit reverses and displays a video of the sub-content on the main screen (see, for example, FIGS. 29 to 31).

Figure 17:
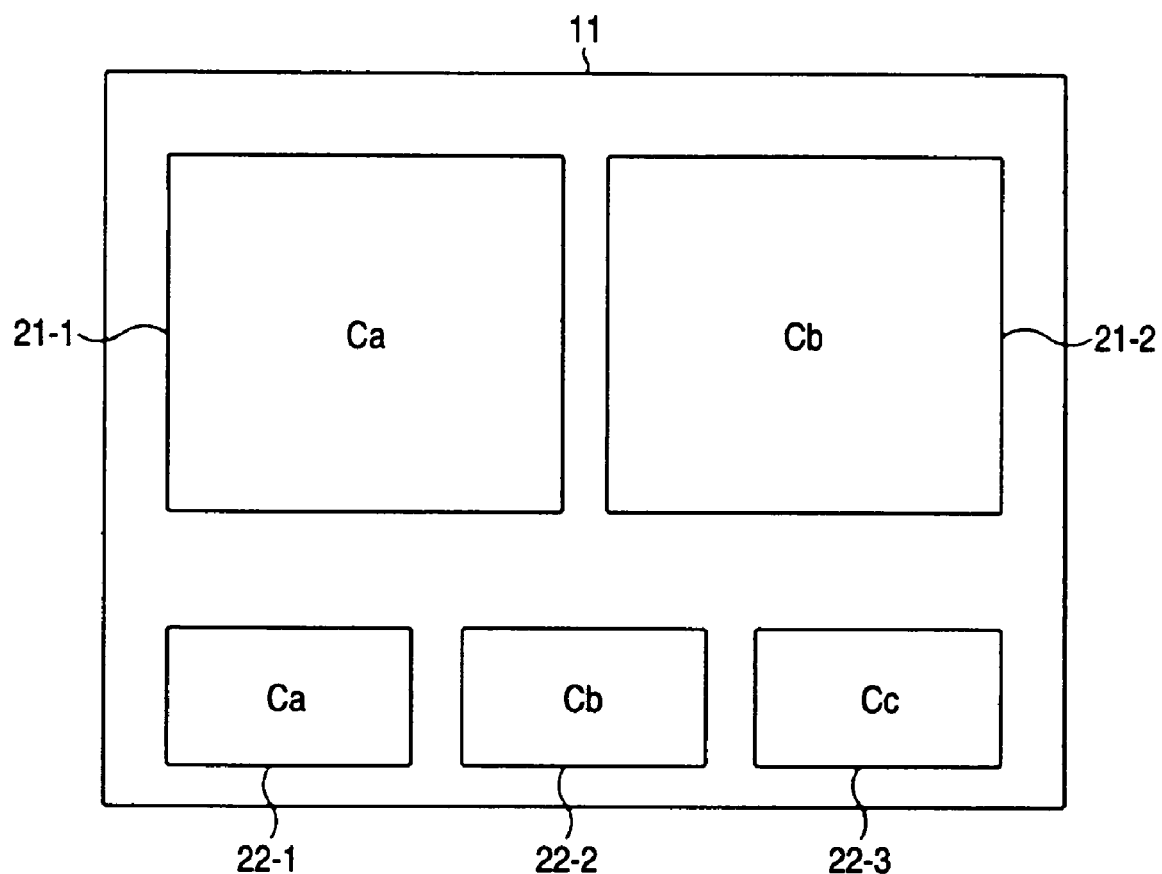
FIG. 17 is a diagram showing still another example of display on the displaying unit 11 of the TV 2 in FIG. 1.

In an image processing apparatus according to still another embodiment of the invention, the control unit displays, when characteristic amounts exceeding the threshold are simultaneously detected from plural sub-contents, all or an part of the plural sub-contents on the main screen (see, for example, FIG. 17).

Figure 16:
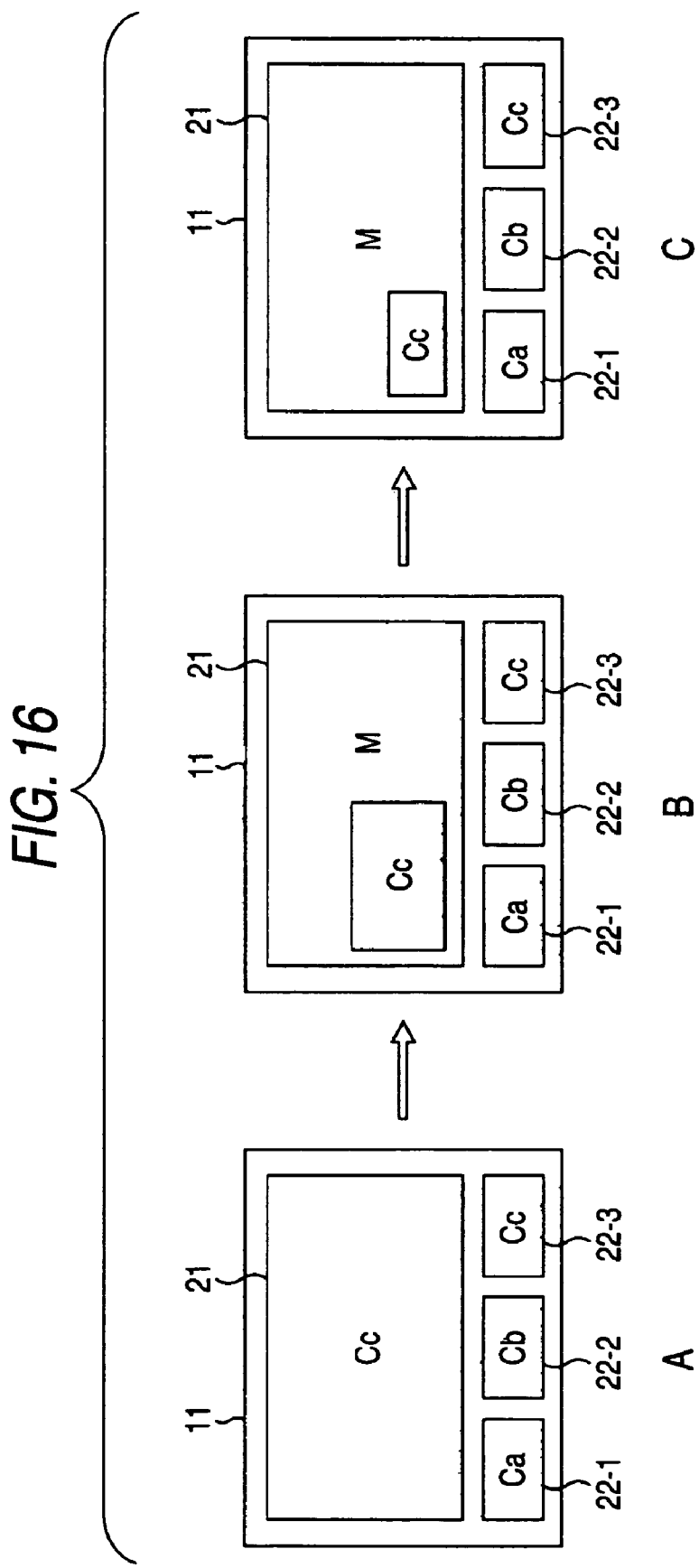
FIG. 16 is a diagram showing still another example of display on the displaying unit 11 of the TV 2 in FIG. 1.

In an image processing apparatus according to still another embodiment of the invention, the control unit changes the display of the sub-content displayed on the main screen according to transition of the characteristic amount (see, for example, FIG. 16).

An image processing apparatus according to still another embodiment of the invention further includes a recording unit (e.g., a recording control unit 207 in FIG. 6) that records the sub-contents displayed on the sub-screens.

Figure 32:
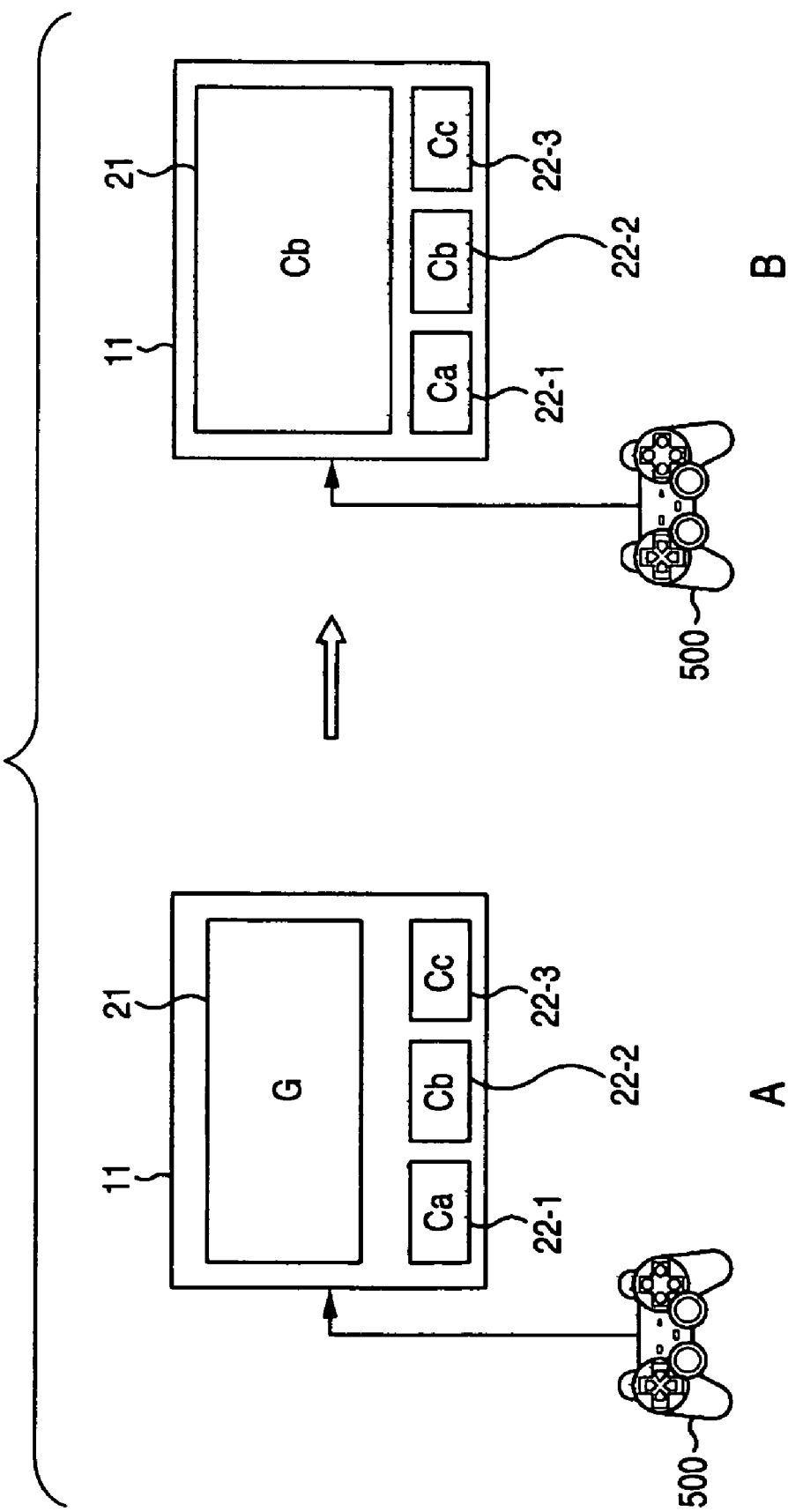
FIG. 32 is a diagram showing still another example of display on the displaying unit 11 of the TV 2 in FIG. 1.

In an image processing apparatus according to still another embodiment of the invention, the main content is a broadcast program or game content (see, for example, FIGS. 3 and 32).

An image processing apparatus according to still another embodiment of the invention further includes a sound outputting unit (e.g., a sound-output control unit 205 in FIG. 6) that outputs sound of the main content displayed on the main screen and sounds of the sub-contents displayed on the sub-screens. The control unit controls the sound outputting unit on the basis of the characteristic amounts detected by the detecting unit (see, for example, FIGS. 36 and 37).

Figure 6:
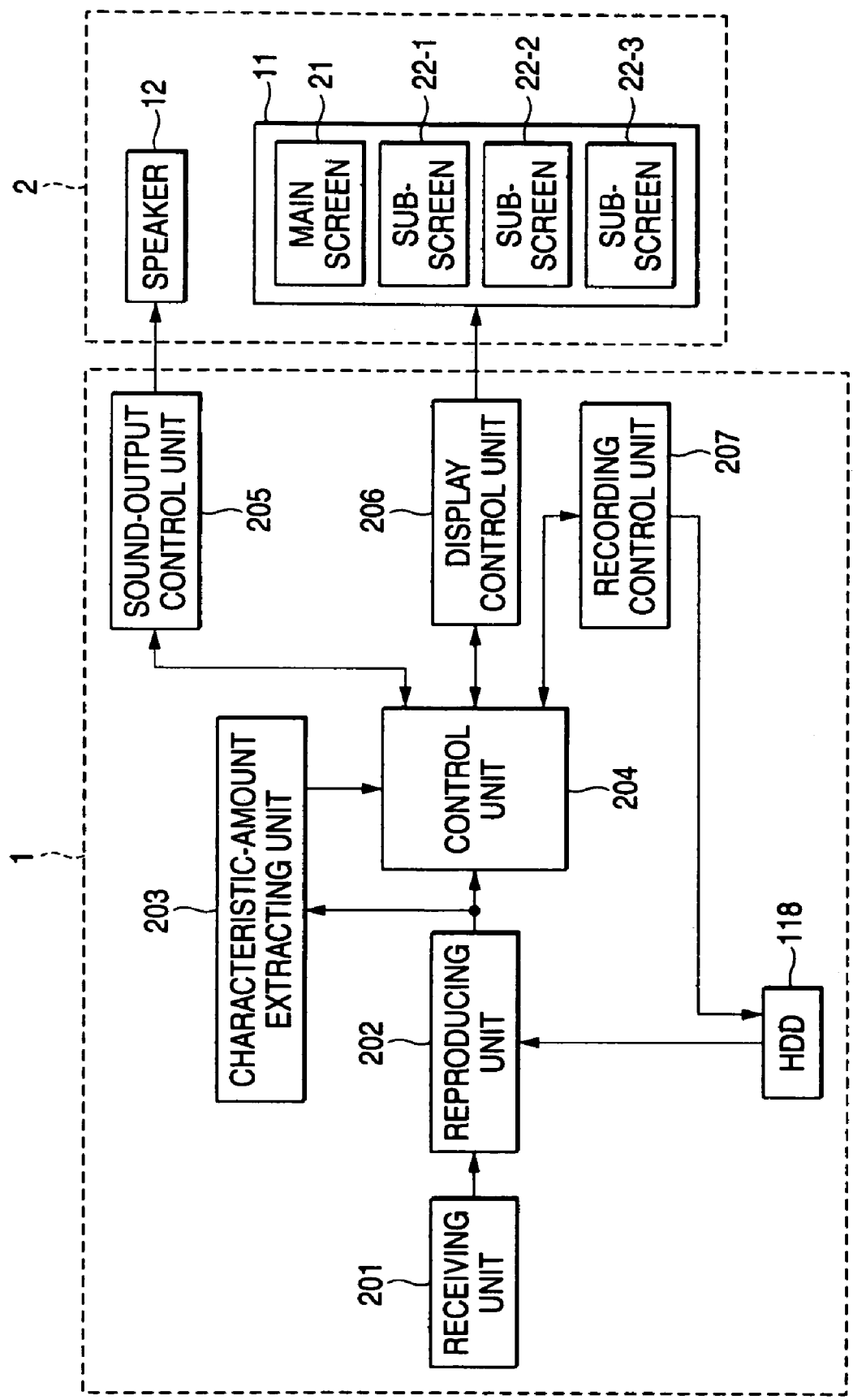
FIG. 6 is a block diagram showing an example of a functional structure of the image processing apparatus 1 in FIG. 1.
Figure 7:
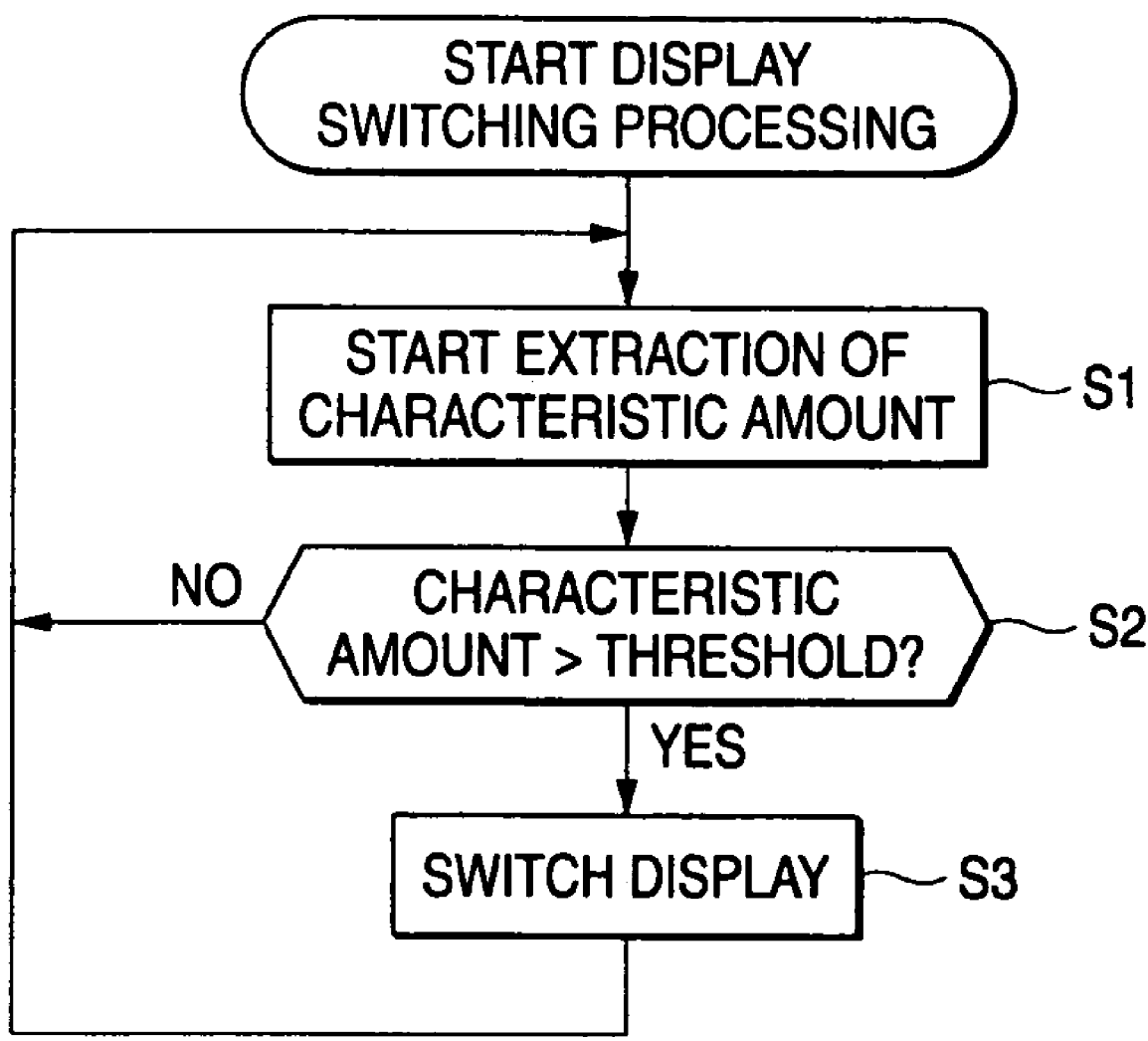
FIG. 7 is a flowchart for explaining display switching processing.

An image processing method according to still another embodiment of the invention and a program according to still another embodiment of the invention include a displaying step of displaying a main content on the main screen and displaying sub-contents on the sub-screens (processing of the display control unit 206 in FIG. 6), a detecting step of detecting characteristic amounts of the sub-contents displayed on the sub-screens (e.g., step S1 in FIG. 7), and a control step of switching the display on the main screen on the basis of the characteristic amounts detected by processing in the detecting step (e.g., steps S2 and S3 in FIG. 7).

Embodiments of the invention will be hereinafter explained with reference to the accompanying drawings.

FIG. 1 is a diagram showing an example of an external appearance of an image processing apparatus 1 according to an embodiment of the invention and a television receiver 2 (hereinafter referred to as TV 2) connected to the image processing apparatus 1 via a cable.

Figure 2:
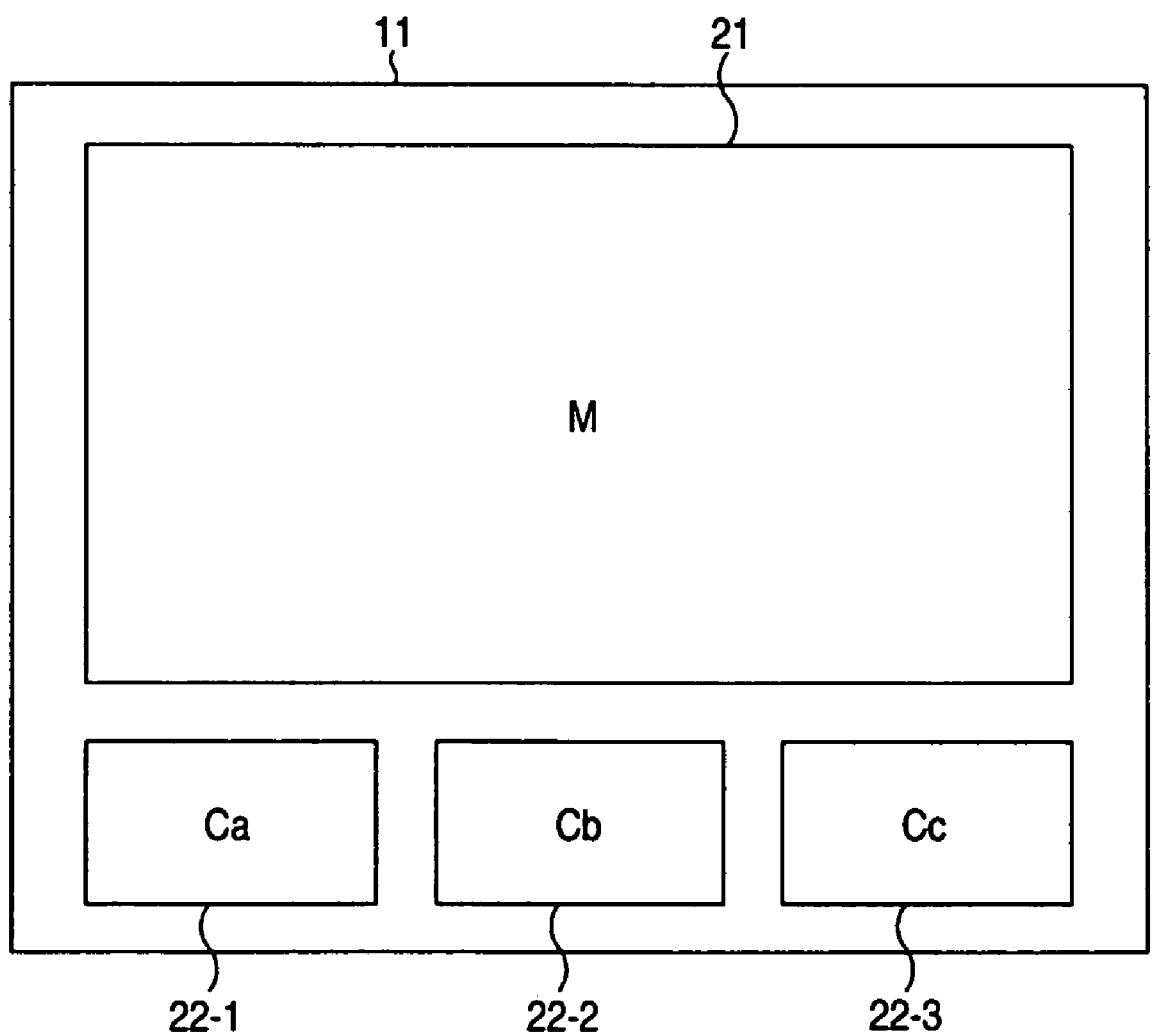
FIG. 2 is a diagram showing an example of display on a displaying unit 11 of a television receiver (TV) 2 in FIG. 1.
Figure 5:
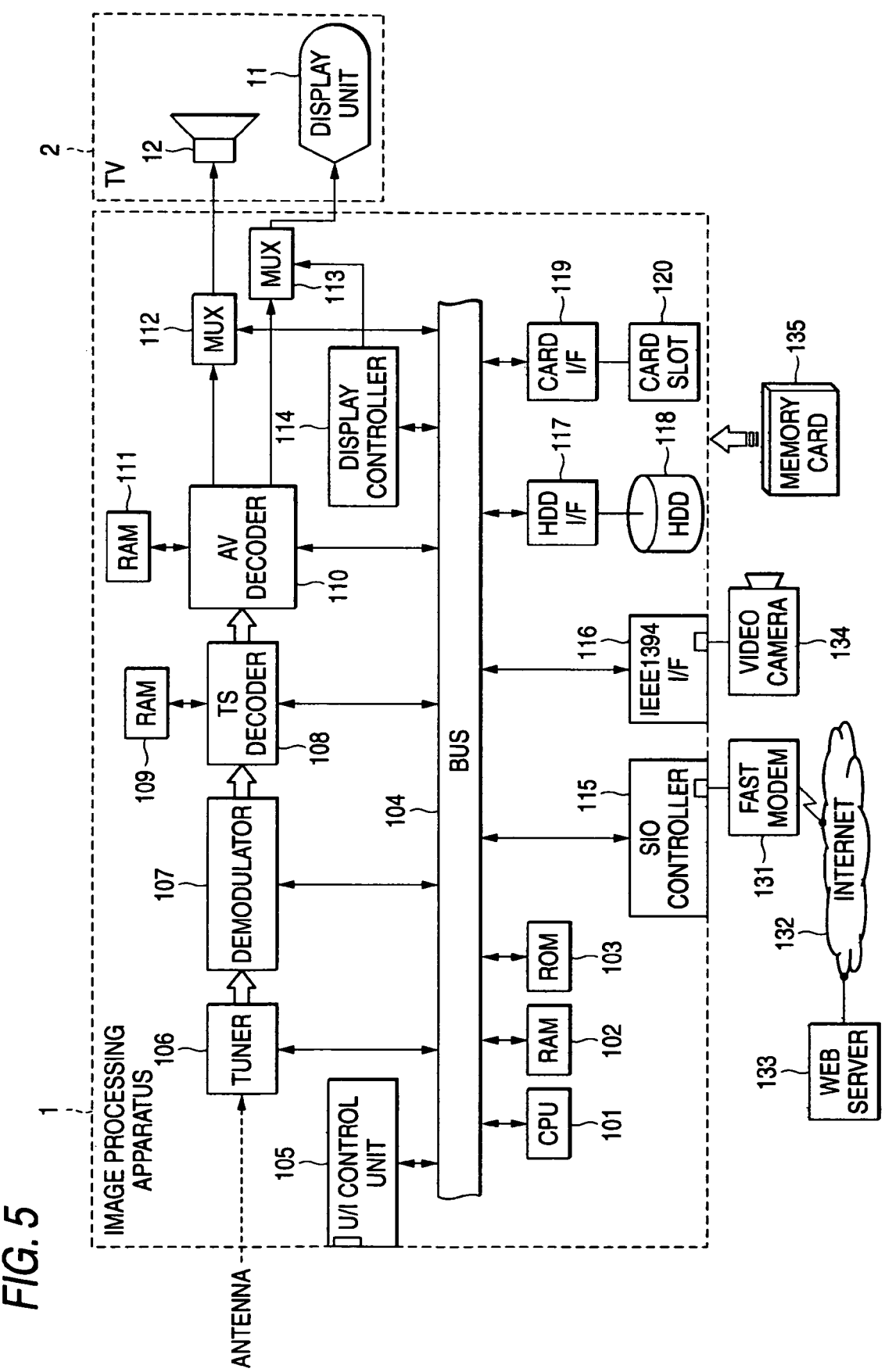
FIG. 5 is a block diagram showing an example of a hardware configuration of the image processing apparatus 1 in FIG. 1.

The image processing apparatus 1 is a digital recording apparatus including a hard disk (HD) 118 (FIG. 5). For example, the image processing apparatus 1 can acquire data of plural contents from a broadcast wave received via a not shown antenna and multiply display a video corresponding to the data of the contents acquired (hereinafter referred to as a video of content according to circumstances) on a displaying unit 11 of the TV 2 as shown in FIG. 2.

In an example shown in FIG. 2, one main screen 21 (a large screen) and three sub-screens 22-1 to 22-3 (small screens) (hereinafter simply referred to as sub-screens 22 when it is unnecessary to distinguish the sub-screens individually) are provided. Predetermined content (content displayed on the main screen 21 in an initial state is referred to as content M) is displayed on the main screen 21.

The content M may be arbitrary content selected by a viewer. Alternatively, a live program may be preferentially displayed on the main screen 21 as the content M.

On the respective sub-screens 22, for example, content broadcasted on a predetermined channel is displayed. In the example shown in FIG. 2, content Ca, content Cb, and content Cc are displayed on the sub-screen 22-1, the sub-screen 22-2, and the sub-screen 22-3, respectively. The image processing apparatus 1 can simultaneously record the content Ca, the content Cb, and the content Cc displayed on the sub-screen 22 (hereinafter referred to as contents C when it is unnecessary to distinguish the contents individually) in the HD 118.

The image processing apparatus 1 can further detect characteristic amounts of the contents C displayed on the sub-screens 22 and switch the display on the screen 21 according to the characteristic amounts.

For example, as shown in FIG. 2, in an initial state, the content M, the content Ca, the content Cb, and the content Cc are displayed on the main screen 21, the sub-screen 22-1, the sub-screen 22-2, and the sub-screen 22-3, respectively. In this state, when a characteristic amount of the content Cc displayed on the sub-screen 22-3 exceeds a predetermined threshold, as shown in FIG. 3, it is possible to switch the display on the main screen 21 from a video of the content M to a video of a scene at that point of the content Cc (hereinafter referred to as characteristic scene).

The characteristic amounts can be set as, for example, volumes obtained from sound signals of the contents C or magnitudes of the sound signals at a predetermined frequency. In a replay broadcast program of the soccer, for example, when a goal is scored, a sound output of cheering and the like of audiences increases and a volume or a magnitude of a sound signal at a predetermined frequency increases. Thus, if the volume and the magnitude of the sound signal are set as characteristic amounts, it is possible to detect a goal scene (a climax scene) as a characteristic scene and display a video from the climax scene on the large main screen 21.

Figure 4:
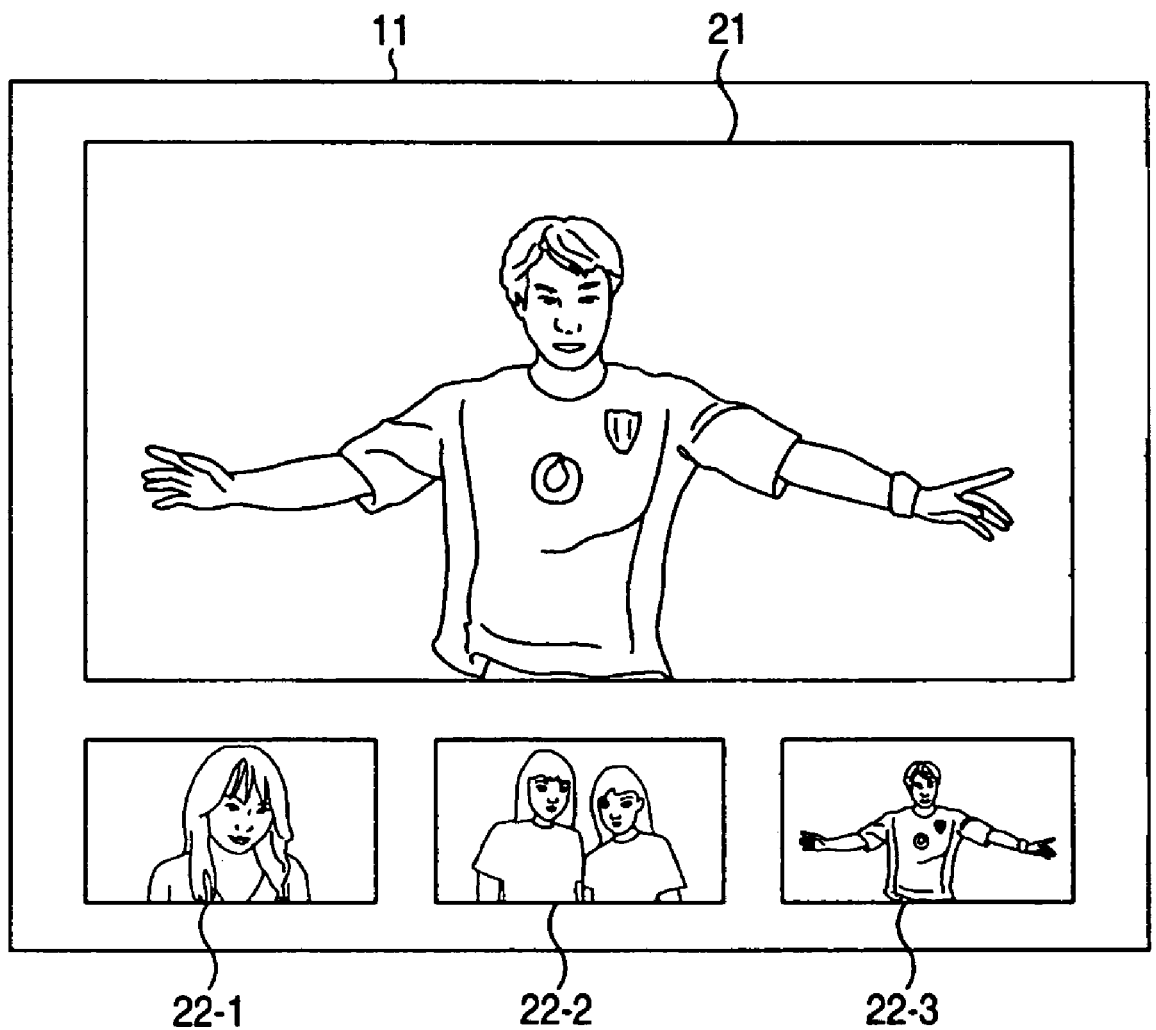
FIG. 4 is a diagram showing still another example of display on the displaying unit 11 of the TV 2 in FIG. 1.

In other words, when the content Cc in FIGS. 2 and 3 is a relay broadcast program of the soccer, as shown in FIG. 4, it is possible to display the climax scene at that point (in the case of this example, a close-up video of a player who scored the goal) on the main screen 21.

The characteristic amounts can also be set as degrees of matching of images of the contents C and, for example, an image of the face of a predetermined actor. If the degrees of matching are set as the characteristic amounts, a high degree of matching is obtained from an image of a scene in which the actor appears in a drama program. Thus, it is possible to detect the scene in which the actor appears as a characteristic scene and display a video from the scene on the large main screen 21.

The characteristic amounts are not limited to the examples described above as long as the characteristic amounts represent characteristics of the contents C.

According to the embodiment of the invention, it is possible to switch the display on the main screen 21 according to the characteristic amounts of the contents C displayed on the sub-screens 22, for example, display the contents C displayed on the sub-screens 22 on the main screen 21 according to the characteristic amounts. Thus, if a characteristic amount matching preference of a viewer is set, the viewer can appropriately view videos of the contents C matching the preference on the main screen 21 while viewing the content M on the main screen 21.

Images displayed on the sub-screens 22 maybe moving images or still images.

FIG. 5 is a block diagram showing an example of a hardware configuration of the image processing apparatus 1.

A central processing unit (CPU) 101 executes a program stored in a read only memory (ROM) 103 or a program loaded to a random access memory (RAM) 102 from the HD 118 via a HD interface (I/F) 117 and a bus 104. The CPU 101 controls, for example, operations of respective units according to an instruction from a user received by an user interface (UI) control unit 105 (e.g., a command from a not-shown remote controller).

A tuner 106 receives a broadcast signal from a not-shown antenna and outputs a reception signal to a demodulator 107 in accordance with the control by the CPU 101.

The demodulator 107 demodulates the reception signal supplied from the tuner 106 and outputs a transport stream broadcasted on a predetermined channel to a transport stream (TS) decoder 108.

The TS decoder 108 extracts, using a RAM 109, a predetermined stream from the transport stream supplied from the demodulator 107 and outputs a packet constituting the stream extracted onto the bus 104 or an audio-visual (AV) decoder 110 in accordance with the control by the CPU 101. The packet (data of content) supplied onto the bus 104 is, for example, supplied to the HD 118 via the HD I/F 117 and recorded therein. An electronic program guide (EPG) obtained by the TS decoder 108 is also appropriately supplied to the HD 118 and recorded therein.

The AV decoder 110 decodes, using a RAM 111, video data (a video packet) and audio data (an audio packet) supplied from the TS decoder 108 and outputs an audio signal and a video signal obtained by the decoding to a multiplexer (MUX) 112 and an MUX 113, respectively.

The MUX 112 outputs sound corresponding to the audio signal supplied from the AV decoder 110 from a speaker 12 of the TV 2.

The MUX 113 displays a predetermined image (screen) on the displaying unit 11 of the TV 2 on the basis of the video signal supplied from the AV decoder 110 and a video signal (on screen display (OSD) signal) supplied from a display controller 114.

The display controller 114 generates a video signal for multiply displaying contents of the main screen 21, the sub-screens 22, and the like and outputs the video signal generated to the MUX 113 in accordance with the control by the CPU 101.

A serial I/O (SIO) controller 115 makes connection to a Web server 133 or the like via the Internet 132 by controlling a fast modem 131 and downloads an EPG or the like as required. The EPG obtained by the download is supplied to the HD 118 and stored therein.

An IEEE (Institute of Electrical and Electronics Engineers) 1394 I/F 116 captures video data from a video camera 134 connected thereto via an IEEE 1394 cable.

The HD I/F 117 stores data supplied via the bus 104 in the HD 118 and supplies the data stored in the HD 118 to the respective units via the bus 104 in response to a request.

A card I/F 119 records data supplied via the bus 104 in a memory card 135 inserted in a slot 120. The card I/F 119 reads out the data recorded in the memory card 135 and outputs the data onto the bus 104. FIG. 6 is a diagram showing an example of a functional structure according to a multi-display function of the image processing apparatus 1.

An input unit 201 (realized by the tuner 106, the SIO controller 115, the IEEE 1394 I/F 116, the HD I/F 117, the CPU 101, and the like shown in FIG. 5) inputs, for example, a broadcast signal received via the antenna, content received via the network 132, and content stored in the HD 118 and supplies the broadcast signal and the contents to a reproducing unit 202.

The reproducing unit 202 (realized by the demodulator 107, the TS decoder 108, the RAM 109, the AV decoder 110, and the RAM 111, the CPU 101, and the like shown in FIG. 5) reproduces the broadcast signal and the like supplied from the input unit 201 and supplies a video signal and an audio signal of predetermined content obtained as a result of the reproduction to a characteristic-amount extracting unit 203 and a control unit 204.

The characteristic-amount extracting unit 203 (realized by the CPU 101 and the like shown in FIG. 5) analyzes the video signal and the audio signal supplied from the reproducing unit 202, extracts, for example, a characteristic amount corresponding to designation of a viewer, and supplies the characteristic amount to the control unit 204.

For example, when the characteristic amount is set as a volume or a magnitude of a sound signal at a predetermined frequency, predetermined sound analysis is performed and a volume, a magnitude of a sound signal at a predetermined frequency, or the like obtained as a result of the sound analysis is supplied to the control unit 204.

When the characteristic amount is set as a degree of matching with a predetermined image, the video signal supplied from the reproducing unit 202 is analyzed and a degree of matching with an image of the video signal is detected and supplied to the control unit 204.

The control unit 204 (realized by the CPU 101 and the like) controls the display control unit 206 to multiply display videos of respective contents corresponding to the video signal supplied from the reproducing unit 202. In that case, the control unit 204 performs, for example, processing for comparing the characteristic amount supplied from the characteristic-amount extracting unit 203 with a predetermined threshold, detecting a characteristic scene (a climax scene, a scene in which a predetermined-actor appears, etc.), and notifying the sound-output control unit 205 and the display control unit 206 of content in which the characteristic scene is detected.

The control unit 204 also controls the sound-output control unit 205 to output sound corresponding to the sound signal supplied from the reproducing unit 202 from the speaker 12.

The control unit 204 also controls the recording control unit 207 to record the video signal and the audio signal supplied from the reproducing unit 202 in the HD 118.

The sound-output control unit 205 (realized by the MUX 112, the CPU 101, and the like shown in FIG. 5) outputs sound of the content from the speaker 12 in accordance with the control by the control unit 204 as described later.

The display control unit 206 (realized by the MUX 113, the display controller 114, the CPU 101, and the like shown in FIG. 5) multiply displays the content on the displaying unit 11 in accordance with the control by the control unit 204 as described later.

The recording control unit 207 stores content data in HD 118 in accordance with the control by the control unit 204.

Display switching processing of the image processing apparatus 1 will be explained with reference to a flowchart shown in FIG. 7.

In this case, as shown in FIG. 2, it is assumed that the main screen 21 and the sub-screens 22-1 to 22-3 are provided in the displaying unit 11 of the TV 2, the content M is displayed on the main screen 21, and the content Ca to the content Cc are recorded and simultaneously displayed on the sub-screens 22-1 to 22-3, respectively.

In the image processing apparatus 1, the control unit 204 starts processing for supplying video signals of the content M and the content Ca to the content Cc supplied from the reproducing unit 202 to the display control unit 206. The display control unit 206 starts processing for displaying a video corresponding to the video signal of the content M on the main screen 21, displaying a video corresponding to the video signal of the content Ca on the sub-screen 22-1, displaying a video corresponding to the video signal of the content Cb on the sub-screen 22-2, and displaying a video corresponding to the video signal of the content Cc on the sub-screen 22-3. The recording processing unit 207 starts processing for recording the content Ca to the content Cc in the HD 118. The control unit 204, the display control unit 206, and the recording processing unit 207 start these kinds of processing separately.

In step S1, the characteristic-amount extracting unit 203 starts detection of characteristic amounts of the contents C displayed on the sub-screens 22 and outputs a result of the detection to the control unit 204.

Figure 8:
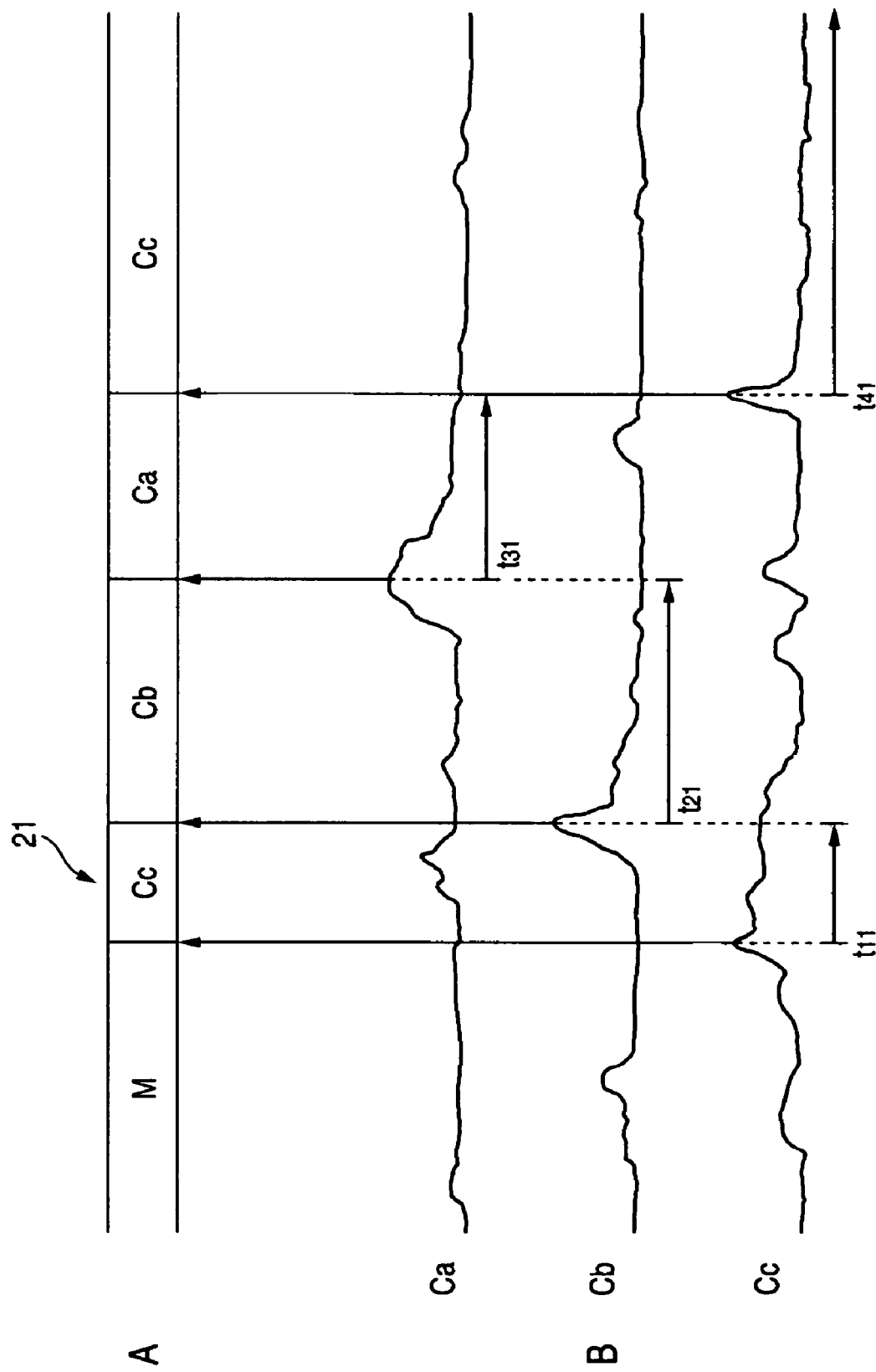
FIG. 8 is a diagram for explaining the display switching processing.

For example, detection of characteristic amounts (e.g., volumes or magnitudes of sound signals at a predetermined frequency) of the content Ca, the content Cb, and the content Cc shown in B in FIG. 8 is started and a result of the detection is supplied to the control unit 204.

In step S2, the control unit 204 compares, for each of the contents C, the characteristic amounts supplied from the characteristic-amount extracting unit 203 and a predetermined threshold. The control unit 204 is on standby until a characteristic amount exceeding the threshold is detected. When a characteristic amount exceeding the threshold is detected, the control unit 204 proceeds to step S3.

In step S3, the control unit 204 notifies the display control unit 206 of one of the contents C (in the example shown in FIG. 3, the content Cc) in which the characteristic amount exceeding the threshold is obtained. The display control unit 206 displays a video from a scene in which the characteristic amount exceeding the threshold is obtained (a characteristic scene) of the content C (the content Cc), which is notified from the control unit 204, on the main screen 21 (FIG. 3).

Figure 9:
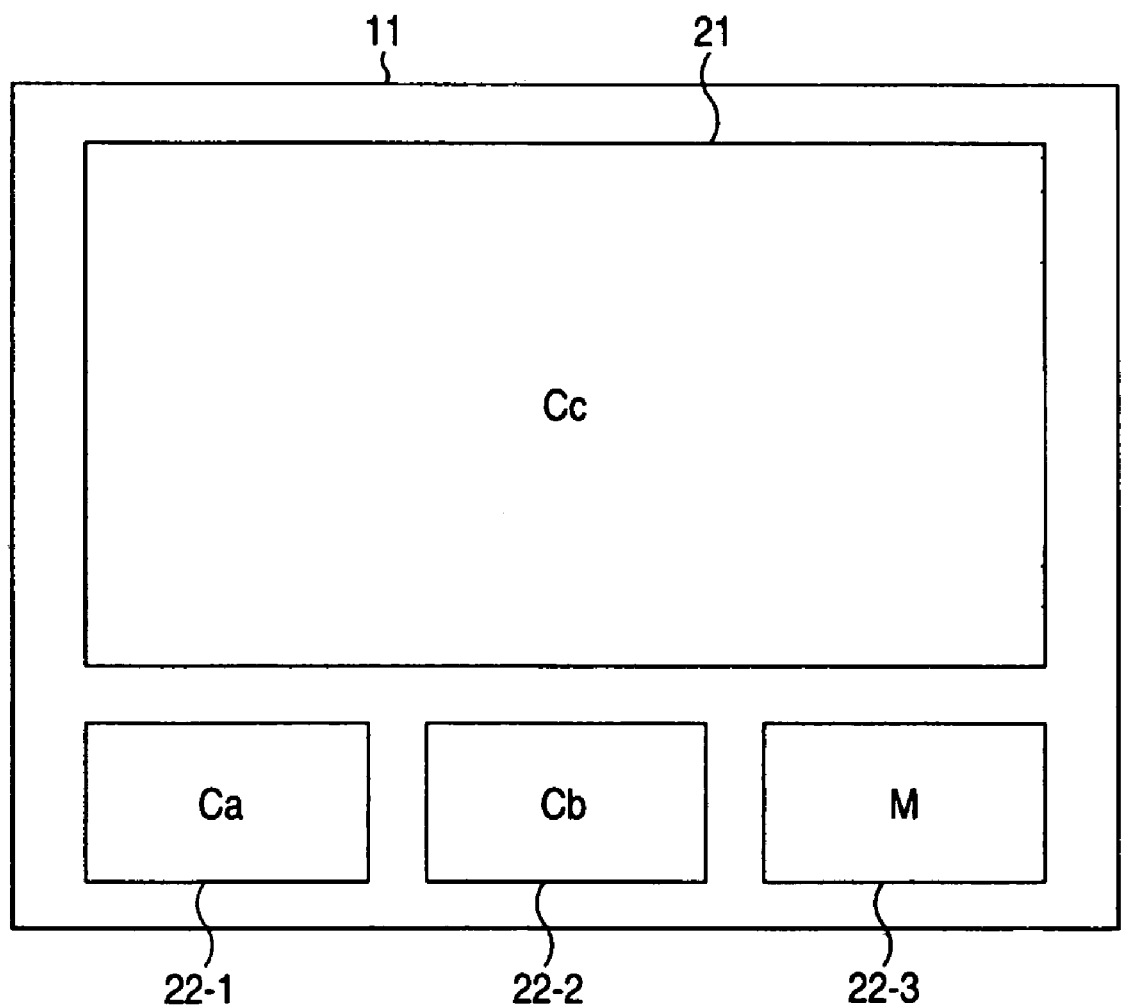
FIG. 9 is a diagram showing still another example of display on the displaying unit 11 of the TV 2 in FIG. 1.

As shown in FIG. 3, the content Cc may be directly displayed on the sub-screen 22-3. Alternatively, as shown in FIG. 9, the content M displayed on the main screen 21 may be displayed on the sub-screen 22-3.

The display switching processing returns to step S2 and the processing in step S2 and the subsequent steps is performed in the same manner.

As described above, the display on the main screen 21 is switched according to characteristic amounts of the contents C displayed on the sub-screens 22.

The display switching processing will be specifically explained with reference to FIG. 8. In an example shown in FIG. 8, a characteristic amount exceeding the threshold is detected from the content Cc at time t11 (a characteristic scene is detected) (B in FIG. 8) (step S2). At that point, the display on the main screen 21 is switched from a video of the content M to a video of the content Cc (FIG. 3 and A in FIG. 8).

A characteristic amount exceeding the threshold is detected from the content Cb at time t21 (B in FIG. 8). At that point, the display on the main screen 21 is switched from the video of the content Cc to a video of the content Cb (A in FIG. 8).

A characteristic amount exceeding the threshold is detected from the content Ca at time t31 (B in FIG. 8). At that point, the display on the main screen 21 is switched from the video of the content Cb to a video of the content Ca (A in FIG. 8).

A characteristic amount exceeding the threshold is detected from the content Cc again at time t41 (B in FIG. 8). At that point, the display on the main screen 21 is switched from the video of the content Ca to the video of the content Cc (A in FIG. 8).

Specifically, in this way, the display on the main screen 21 is switched according to characteristic amounts of the contents C displayed on the sub-screens 22.

In the example shown in FIG. 8, the display on the main screen 21 is not switched until the next characteristic scene is detected. However, it is possible to switch the display on the main screen 21 to the video of the content M displayed on the main screen 21 in the initial state when the characteristic amounts decrease to a fixed value or the next characteristic scene is not detected for a predetermined time Tv.

In an example show in FIG. 10 (characteristic amounts of the contents C are the same as those in the case of FIG. 8), after a characteristic scene is detected from the content Cc at time t41, a characteristic scene is not detected for the predetermined time Tv. Thus, the content M is displayed on the main screen 21 again at time t51 when the time Tv has elapsed.

When the content M is not displayed on the sub-screens 22 either after the display on the main screen 21 is switched to the content C (FIG. 3), the reproduction of the content M is suspended from time t11 to time t51 in the example shown in FIG. 10. In this case, when the content M is a drama program and a broadcast end time t end is determined as shown in FIG. 11, it is necessary to reproduce the content M such that the reproduction is completed by that time.

In such a case, in an example shown in FIG. 11, since a remaining reproduction amount of the content M at time t51 is r1, it is possible to reproduce the content M at reproduction speed obtained by dividing the reproduction amount r1 by time from time t51 to time t end (reproduction at speech speed).

In order to reproduce the content M at usual reproduction speed as much as possible, it is also possible to reproduce the content M at high speed from time t51 to time t61 such that, as shown in FIG. 12, a reproduction amount increases to a reproduction amount r2, which makes it possible to reproduce the content M at usual reproduction speed in a relation with a remaining time. The content M is reproduced at the usual reproduction speed from time t61 and the reproduction is completed at time t end.

Figure 13:
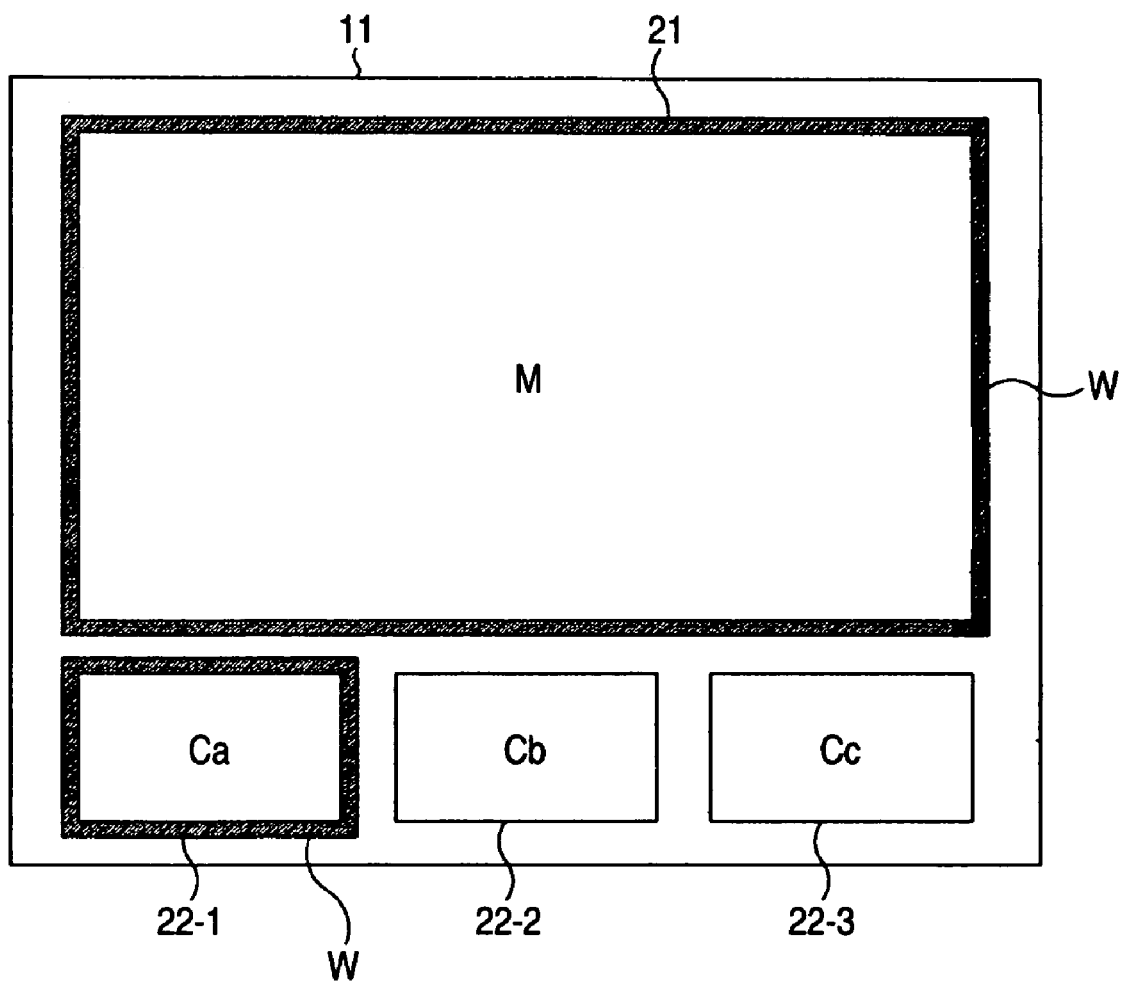
FIG. 13 is a diagram showing still another example of display on the displaying unit 11 of the TV 2 in FIG. 1.

An indication that makes it possible to identify a type of contents displayed on the screens is added to the main screen 21 and the sub-screens 22 shown in FIG. 13. In the case of this example, since the content M and the content Ca are live programs, a frame W indicating that effect is displayed on the main screen 21 and the sub-screens 22-1 on which the content M and the content Ca are displayed.

Since the indication that makes it possible to identify a type of contents displayed on the screen is added to the main screen 21 and the sub-screens 22, a viewer can easily grasp a type of contents displayed on the screens.

For example, when the content M is displayed again after the display on the main screen 21 is switched and the reproduction of the content M is suspended, the viewer can also easily grasp that the content M is content for which the special reproduction is necessary.

In the examples shown in FIGS. 8 and 10, when a special scene is detected, a video from the special scene is displayed on the main screen 21. However, it is also possible to display a video from a scene a predetermined time Tb earlier than the special scene.

In an example shown in FIG. 14 (characteristic amounts of the contents C are the same as those in the case of FIG. 8), a video of the content Cc from a scene at time t10 the time Tb earlier than time t11 is displayed on the main screen 21 from time t11. A video of the content Cb from a scene at time t20 the time Tb earlier than time t21 is displayed on the main screen 21 from time t21.

A video of the content Ca from a scene at time t30 the time Tb earlier than time 31 is displayed on the main screen 21 from time t31. A video of the content Cc from a scene at time t40 the time Tb earlier than time t41 is displayed on the main screen 21 from time t41.

For example, in a relay broadcast program of the soccer, as shown in FIG. 4, a scene showing a player who scored a goal may be detected as a special scene. However, as described above, it is possible to display a video showing how the goal was scored on the main screen 21 by displaying a video from a scene the predetermined time Tb earlier than the scene.

It is possible to determine length of the time Tb according to content. For example, when the content is a relay broadcast program of the soccer, the time Tb may be set as time Tb1.

When the content is a relay broadcast program of the baseball, the time Tb may be set as time Tb2 which is different from time Tb1.

In the examples shown in FIGS. 8, 10, and 14, when a special scene is detected, the display on the main screen 21 is immediately switched. However, when a characteristic state (e.g., a state in which a characteristic amount is equal to or larger than a predetermined value) continues in the contents C presently displayed on the main screen 21, it is possible to switch the display on the main screen 21 only when the characteristic state ends (when the characteristic amount decreases to be smaller than the predetermined value).

In an example shown in FIG. 15 (characteristic amounts of the contents C are the same as those in the case of FIG. 8), the content Cc is displayed on the main screen 21 from time t11. However, since a climax state continues (a state in which a characteristic amount is large continues) until time t13, even if a characteristic scene is detected from the content Cb at time t21 earlier than time t13, the display on the main screen 21 is not switched until time t13. The display of the main screen 21 is switched to the content Cb at a point when the climax of the content Cc ends (time t13).

In the example shown in FIG. 3, the content C in which a characteristic scene is detected continues to be displayed on the main screen 21 until the next characteristic scene is detected. However, it is possible to change the display of the content C according to transition of a characteristic amount of the content C.

For example, as shown in FIG. 16, after the display on the main screen 21 is switched to a video of the content Cc, it is possible to reduce the display of the content Cc stepwise according to the decrease in a characteristic amount of the content Cc such that a video of the content M is displayed in the background of the display of the content Cc.

In the examples shown in FIGS. 3, 8, and the like, characteristic scenes of the respective contents are detected at different timings. However, since characteristic scenes may be simultaneously detected from plural contents, in that case, it is possible to divide the main screen 21 into plural screens and simultaneously display contents of the screens.

For example, as shown in FIG. 17, it is possible to simultaneously display videos of the content Ca and the content Cb, in which characteristic scenes are simultaneously detected, on divided two main screens 21-1 and 21-2.

In an example shown in FIG. 17, the two main screens 21 of the same size are formed. However, as shown in A in FIG. 18, it is also possible to display a video of the content Cb having a larger characteristic amount for the characteristic scenes simultaneously detected on the entire main screen 21 and display a video of the content Ca having a smaller characteristic amount to be included in a part of the main screen 21.

Figure 18:
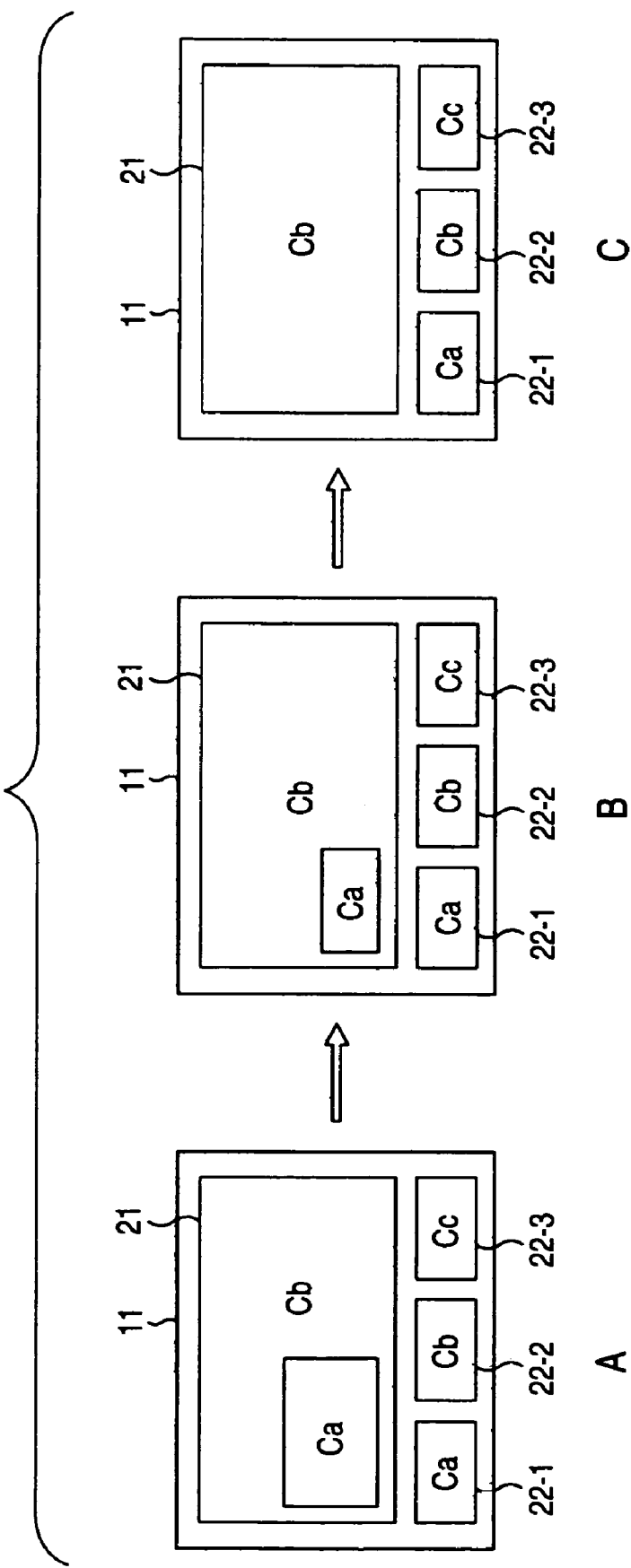
FIG. 18 is a diagram showing still another example of display on the displaying unit 11 of the TV 2 in FIG. 1.

As shown in B and C in FIG. 18, it is also possible to change (in the example shown in FIG. 18, reduce) a video of the content Ca having a smaller characteristic amount stepwise according to a change in the characteristic amount.

Figure 19:
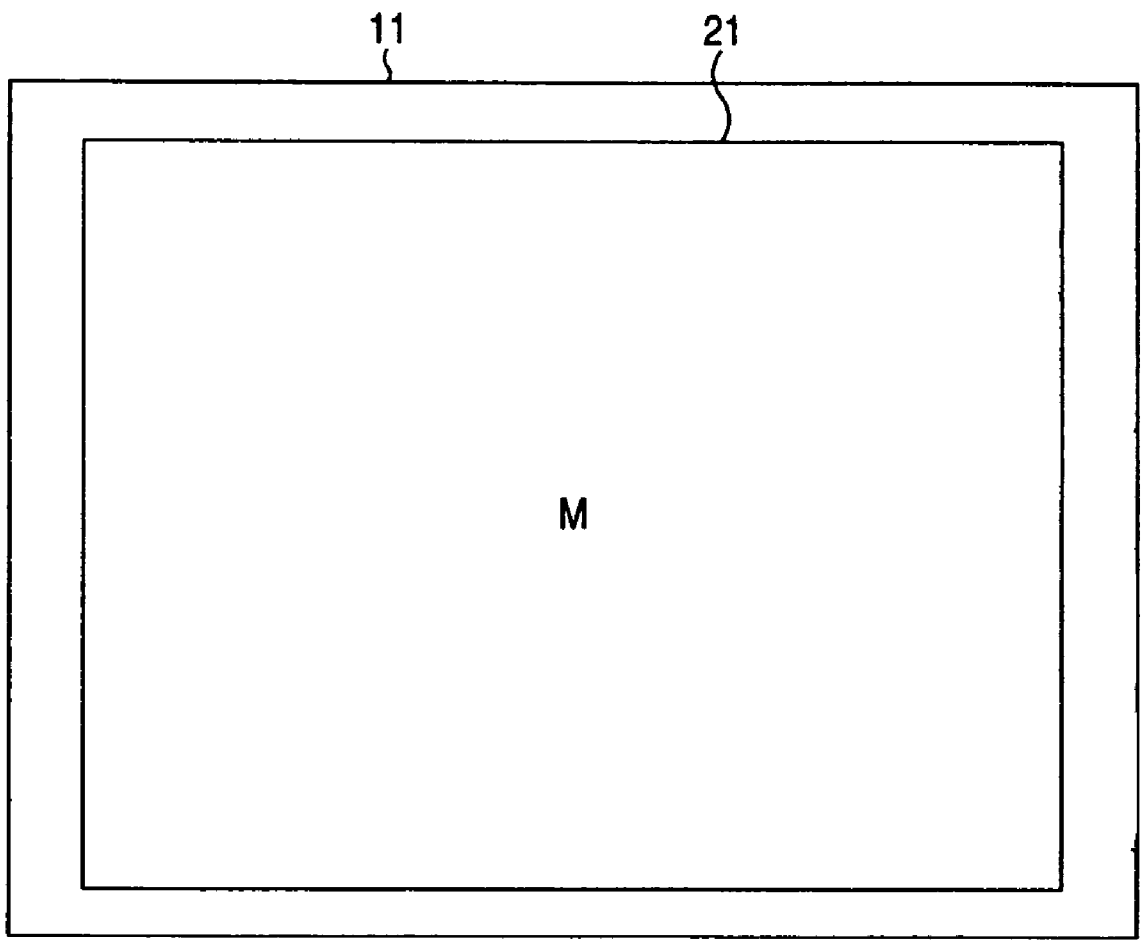
FIG. 19 is a diagram showing still another example of display on the displaying unit 11 of the TV 2 in FIG. 1.
Figure 20:
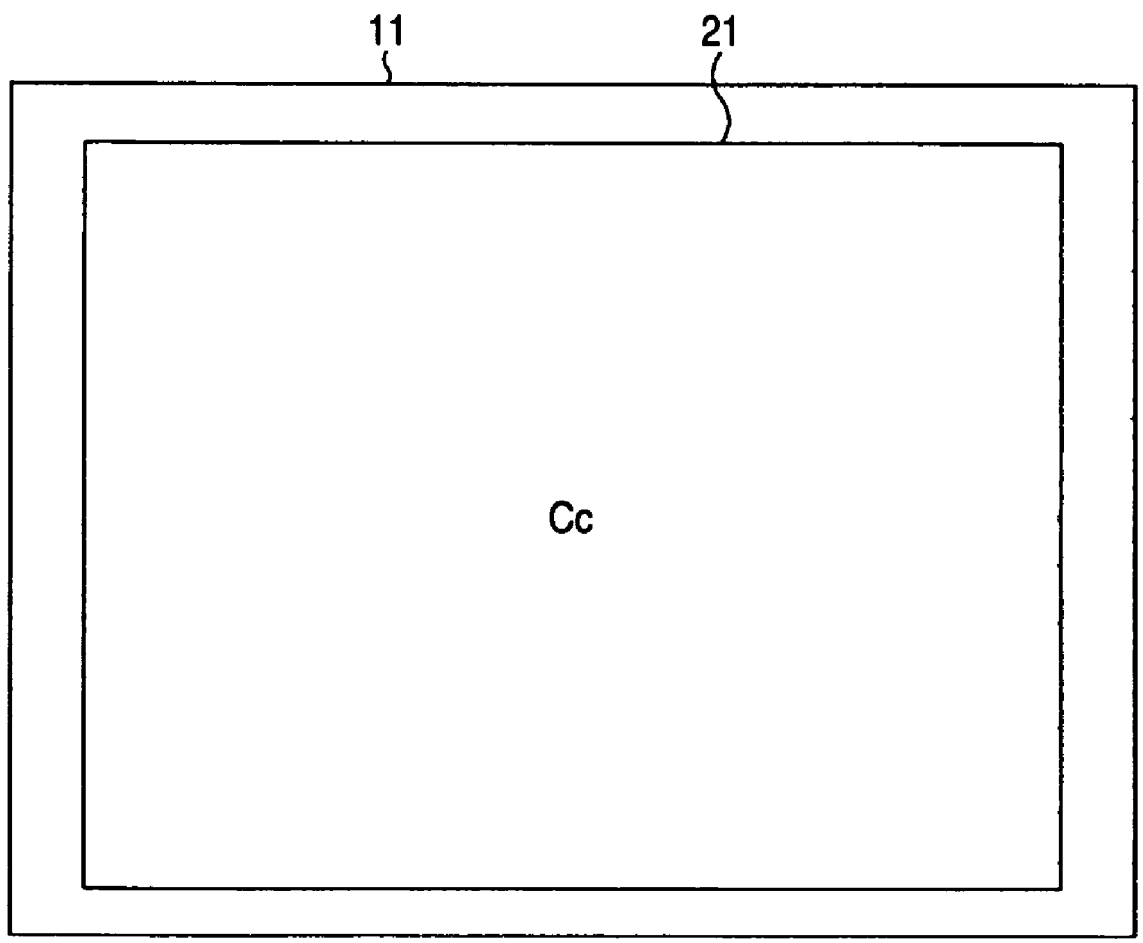
FIG. 20 is a diagram showing still another example of display on the displaying unit 11 of the TV 2 in FIG. 1.

In the examples shown in FIGS. 2 and 3, as the initial state, the sub-screens 22 are provided together with the main screen 21 and the content M and the contents C are displayed on the main screen 21 and the sub-screens 22, respectively. However, as shown in FIG. 19, it is also possible to provide only the large main screen 21 and display the content M on the main screen 21 as the initial state and record the contents C in the background such that the contents C are not displayed. When a characteristic scene is detected in the content C being recorded, as shown in FIG. 20, the content C (the content Cc) in which the characteristic scene is detected is displayed on the main screen 21.

Figure 21:
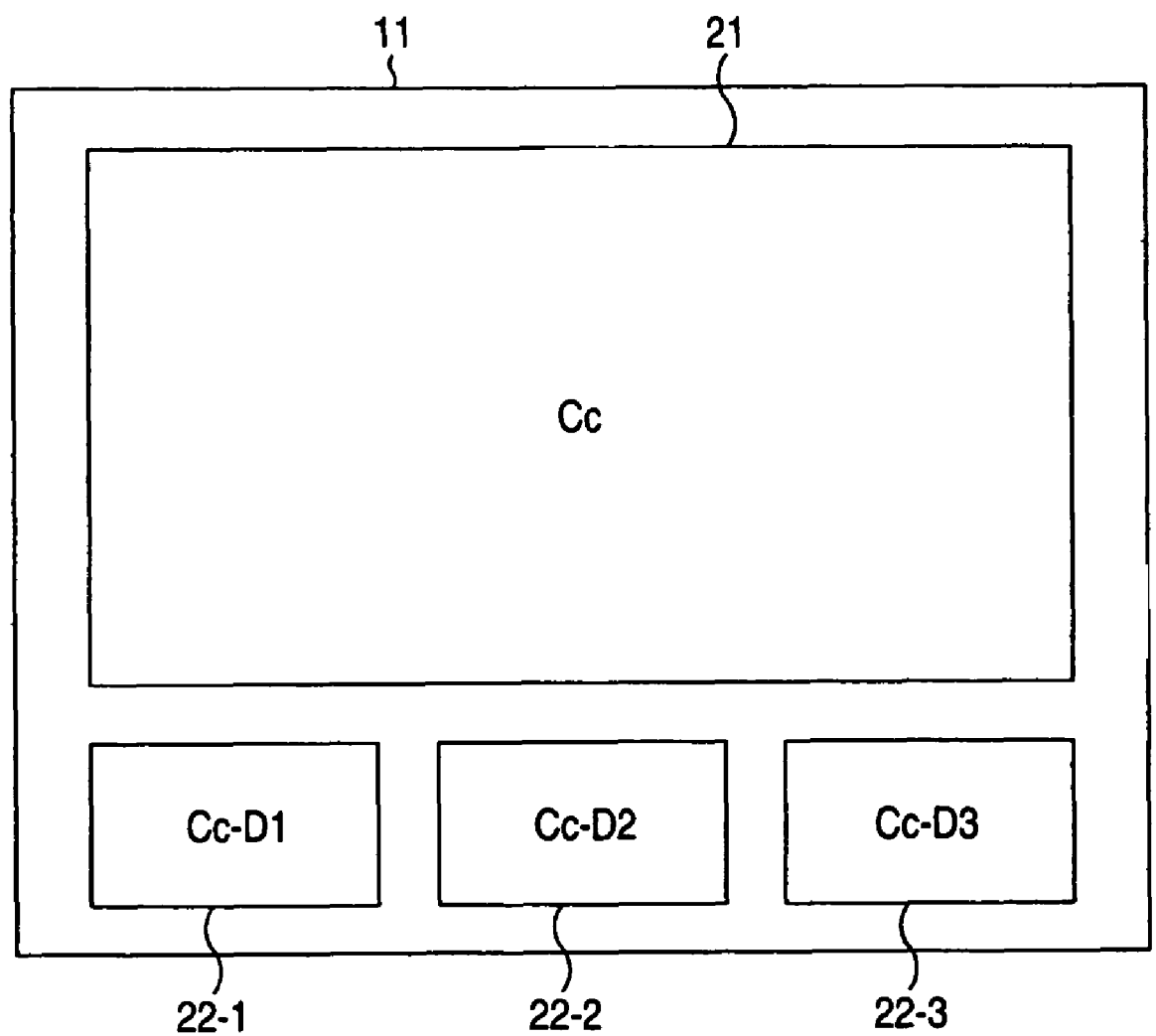
FIG. 21 is a diagram showing still another example of display on the displaying unit 11 of the TV 2 in FIG. 1.

When a characteristic scene is detected in the content C (e.g., the content Cc) being recorded in the background, as shown in FIG. 21, it is also possible to reduce the main screen 21, display the content Cc on the main screen 21, provide the sub-screens 22 anew, and display characteristic scenes (Cc-D1, Cc-D2, and Cc-D3) in the past of the content Cc on the sub-screens 22 in an order of time. It is also possible to display, for example, a list indicating time and the like of characteristic scenes instead of the sub-screens 22.

When the recording of the content C being recorded in the background ends, it is also possible to display the content C on the main screen 21. In that case, as shown in FIG. 21, it is also possible to provide the sub-screens 22 and display characteristic scenes of the content C in an order of time.

Besides, when the viewer performs predetermined operation, it is possible to preferentially display the content C not viewed yet on the main screen 21. In that case, as shown in FIG. 21, it is also possible to provide the sub-screens 22 anew and display characteristic scenes of the content C on the sub-screens 22 in an order of time.

Figure 22:
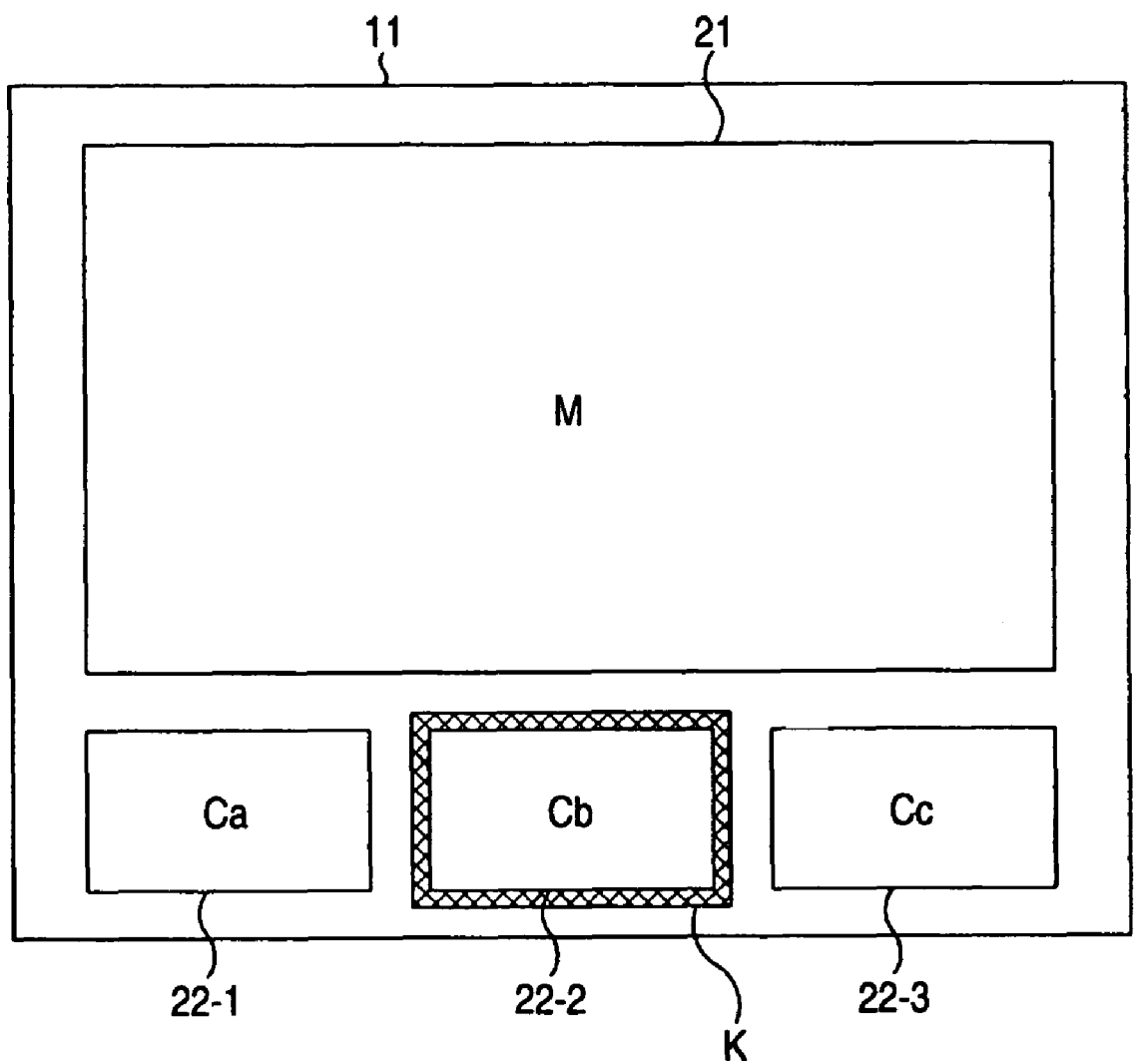
FIG. 22 is a diagram showing still another example of display on the displaying unit 11 of the TV 2 in FIG. 1.
Figure 23:
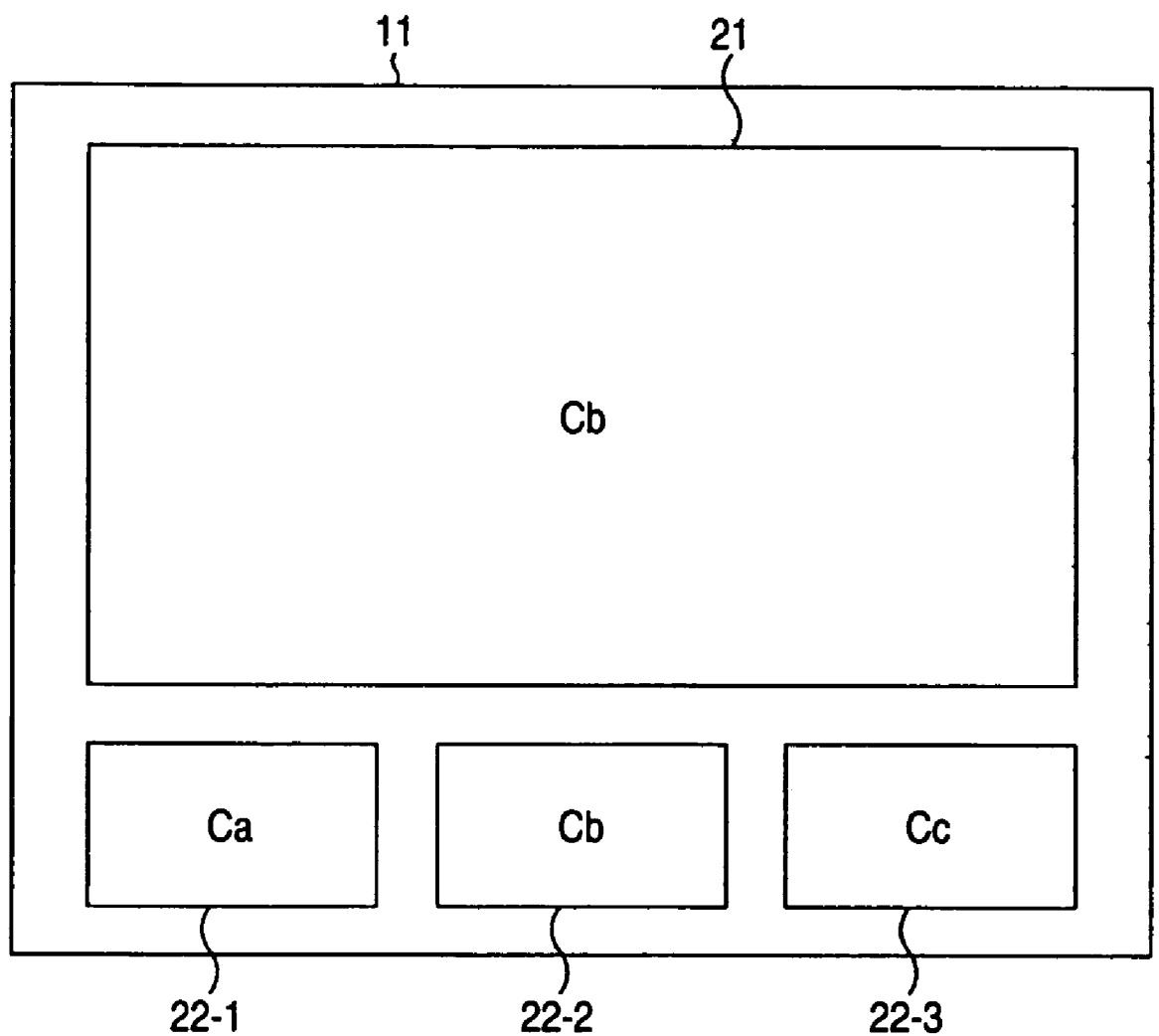
FIG. 23 is a diagram showing still another example of display on the displaying unit 11 of the TV 2 in FIG. 1.

In the examples shown in FIGS. 2, 3, and the like, the display on the main screen 21 is switched when a characteristic scene is detected. However, as shown in FIG. 22, it is also possible to allow the viewer to select a desired sub-screen 22 with a cursor K. As shown in FIG. 23, it is possible to display the content C displayed on the sub-screen 22 selected on the main screen 21.

When the broadcast of the content M displayed on the main screen 21 ends, it is possible to switch the display on the main screen 21.

Figure 24:
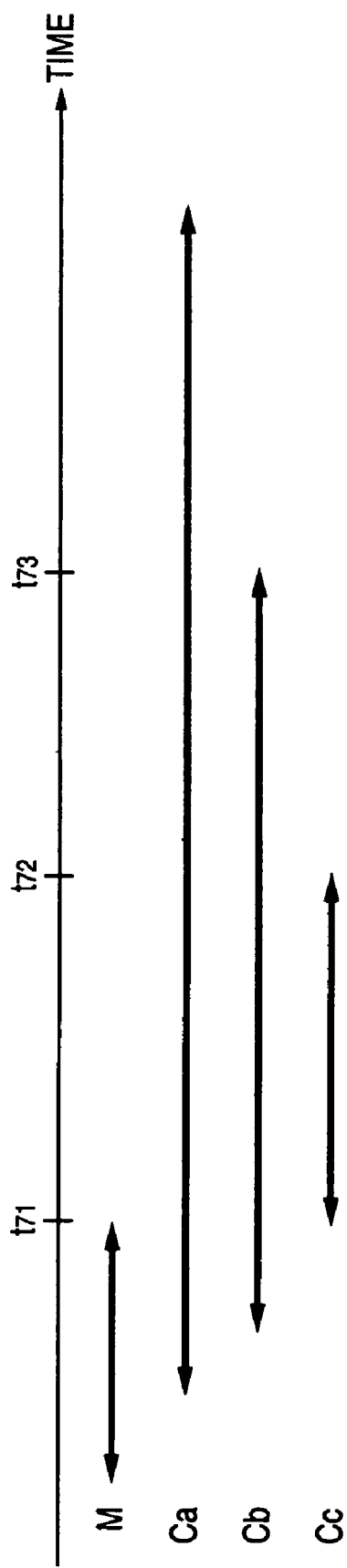
FIG. 24 is a diagram showing an example of broadcast times of contents.
Figure 25:
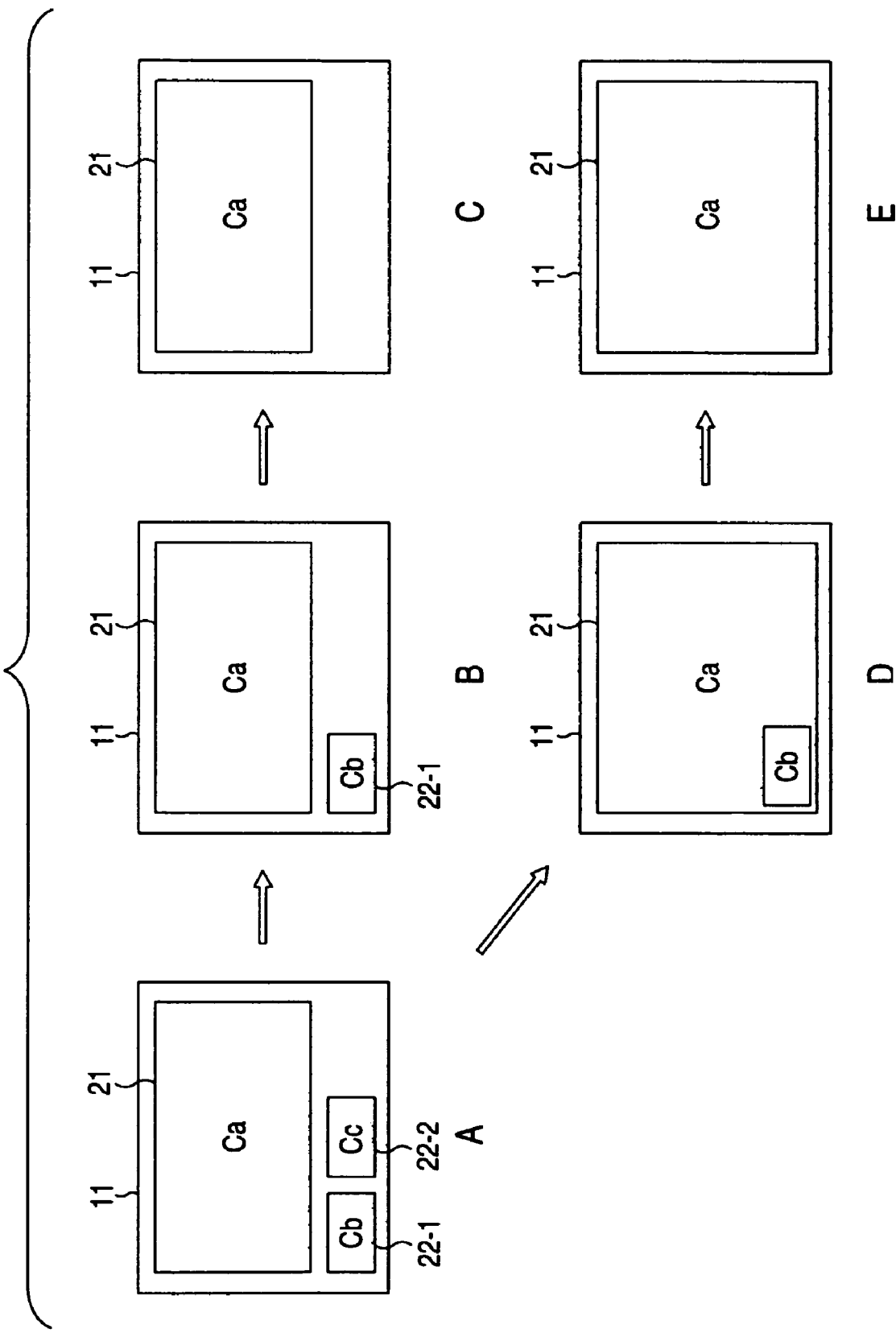
FIG. 25 is a diagram showing still another example of display on the displaying unit 11 of the TV 2 in FIG. 1.

In the case in which the display of the content M displayed on the main screen 21 and the contents C displayed on the sub-screens 22 shown in FIG. 2 ends at timings shown in FIG. 24, when the broadcast of the content M ends at time t71, as shown in A in FIG. 25, it is possible to display the content Ca displayed on the sub-screen 22-1 on the main screen 21.

In this case, the content Cb and the content Cc are moved and displayed in order on the sub-screen 22-1 and the sub-screen 22-2, respectively. The sub-screen 22-3 is erased.

For example, when the broadcast of the content Cc ends at time t72, as shown in B in FIG. 25, the sub-screen 22-2 is erased. When the broadcast of the content Cb ends at time t73, as shown in C in FIG. 25, the sub-screen 22-1 is also erased.

When the number of the sub-screens 22 is reduced, as shown in D in FIG. 25, it is also possible to expand the main screen 21 such that a video of the content displayed on the sub-screen 22 is included in the main screen 21.

Figure 26:
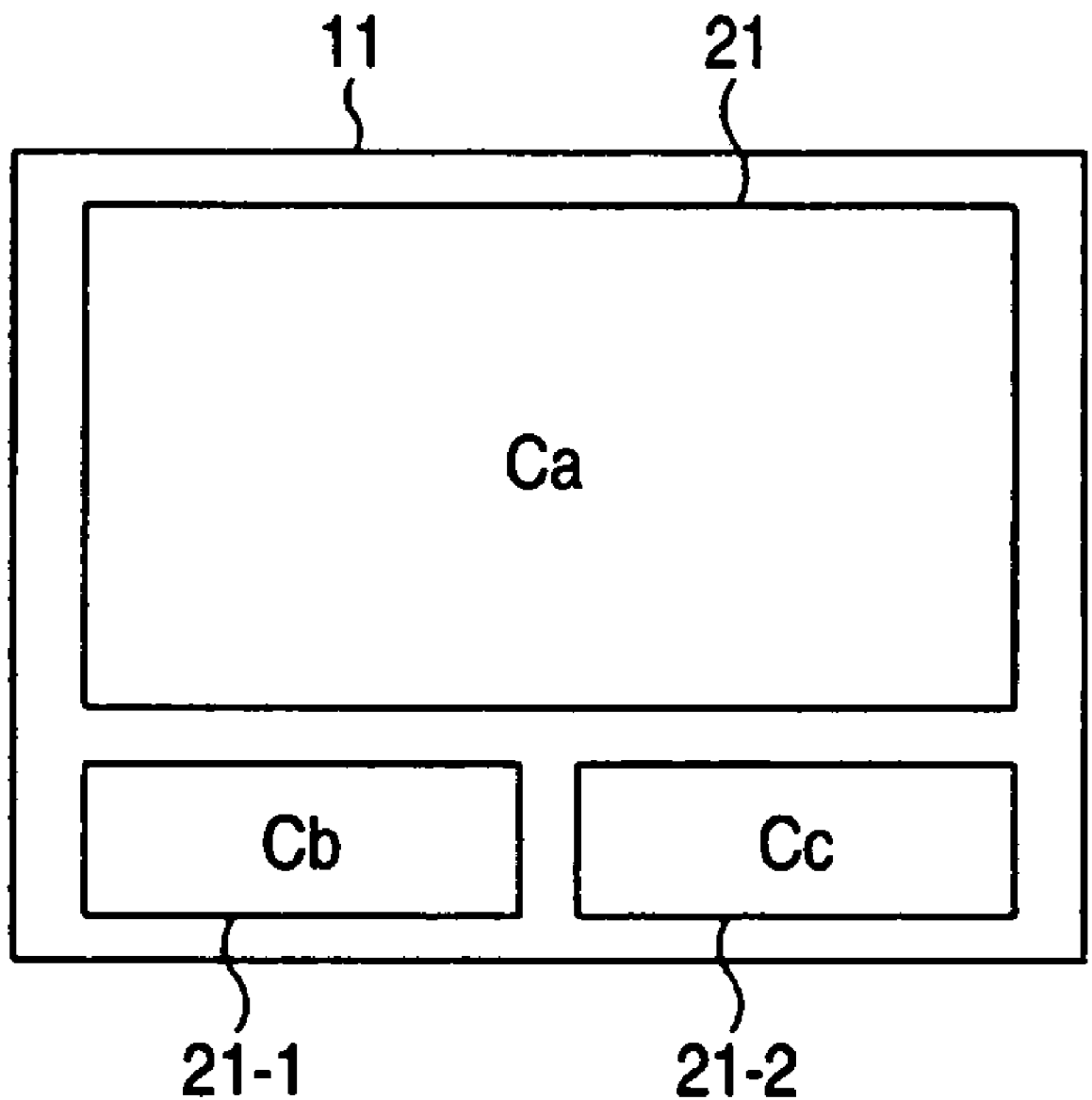
FIG. 26 is a diagram showing still another example of display on the displaying unit 11 of the TV 2 in FIG. 1.

When the sub-screen 22 is deleted, besides simply deleting the sub-screen 22 as in the example shown in A in FIG. 25, it is also possible to extend a size of the remaining sub-screens 22 in a lateral direction to make it easy to see the sub-screens 22 as shown in FIG. 26.

In the above description, an order of the contents C displayed on the sub-screens 2 is not referred to. However, it is also possible to set an order of the contents C displayed on the sub-screens 22 such that the contents C belonging to the same genre are displayed side by side and, when the contents C displayed are changed and the genre is changed, readjust the order of the contents C displayed on the sub-screens 22.

Figure 27:
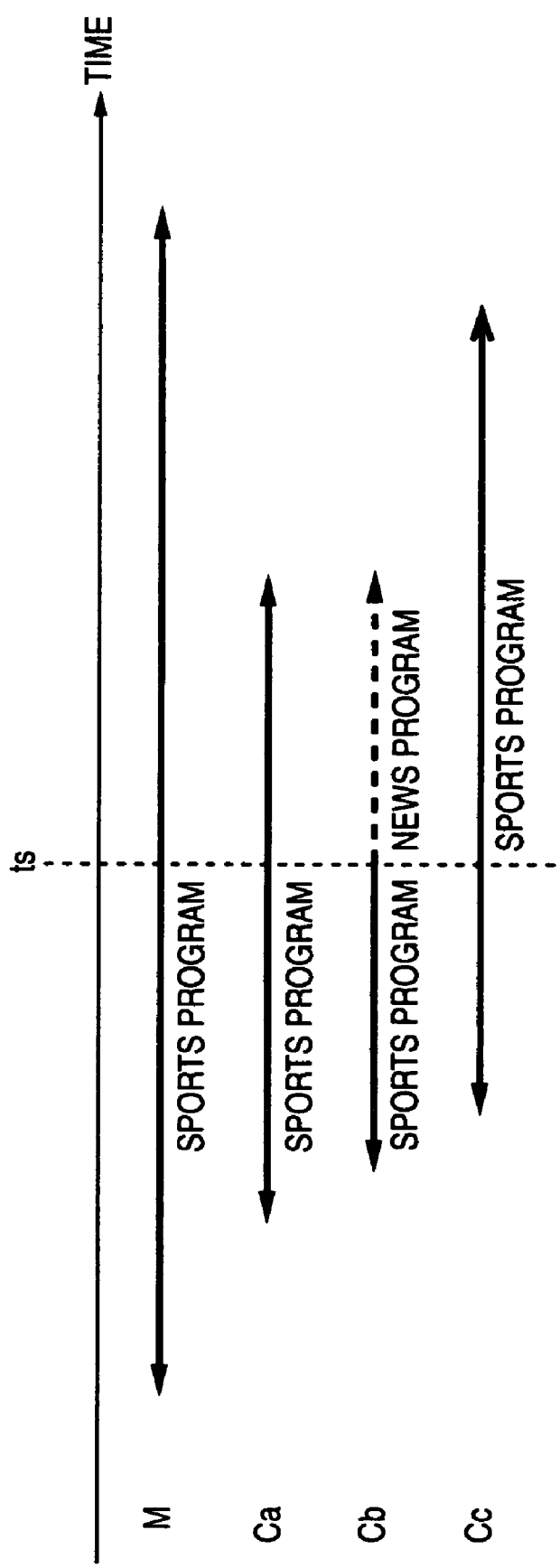
FIG. 27 is a diagram showing an example of genres of contents.
Figure 28:
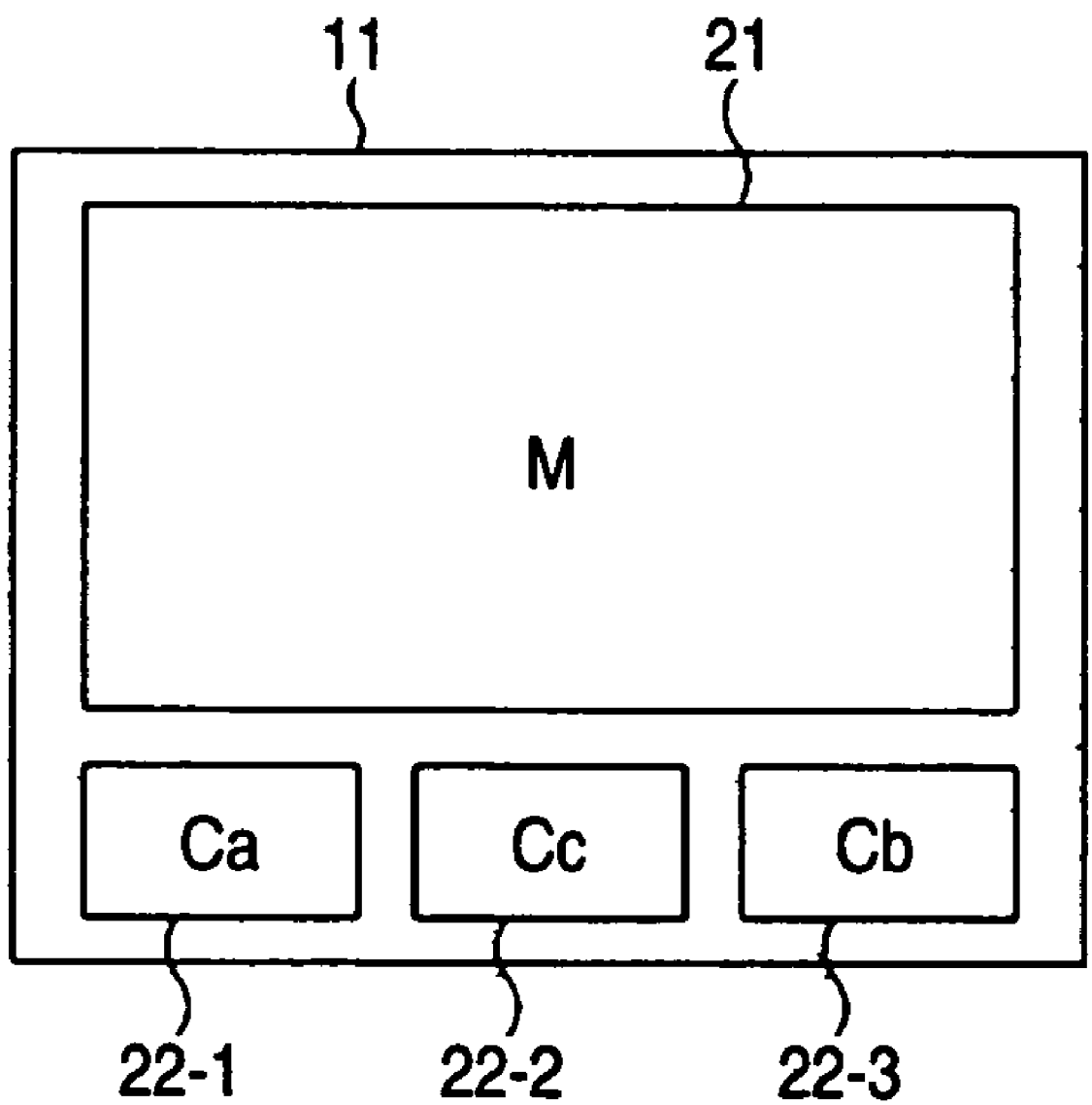
FIG. 28 is a diagram showing still another example of display on the displaying unit 11 of the TV 2 in FIG. 1.

When the content Ca to the content Cc are contents belonging to the same genre in a sports program, for example, as shown in FIG. 2, the contents are displayed in order on the sub-screens 22-1 to 22-3. However, for example, when the content Cb ends (time ts) and content Cb' of a news program is broadcasted as shown in FIG. 27, it is possible to display the content Ca and the content Cc (a sport program) side by side on the sub-screens 22-1 and 22-2 and display the content Cb' in the sub-screen 22-3 as shown in FIG. 28.

In the examples shown in FIGS. 3 and 4, a video from a characteristic scene is directly displayed on the main screen 21. However, it is also possible to display a reversed video.

A video of the content C displayed on the main screen 21 shown in FIG. 29 is a video obtained by reversing a video of the content C displayed on the sub-screen 22-3 shown in FIG. 30 around a line X (a video reflected on a mirror).

For example, when a viewer (a customer at a barbershop) watches a video displayed on the television receiver 2 in a mirror, for example, in the barbershop, if the video reversed in this way is displayed on the main screen 21 when a characteristic scene is detected, it is possible to display, for example, a climax scene such that the viewer can easily see the scene.

As shown in FIG. 29, it is also possible to directly display the video not reversed on the sub-screen 22-3. As shown in FIG. 31, it is also possible to directly display the video not reversed (the video on the sub-screen 22-3 shown in FIG. 30) on the main screen 21 and display the reversed image on the sub-screen 22-3.

In the example shown in FIG. 3, for example, the content M received is displayed on the main screen 21. However, as shown in A in FIG. 32, it is also possible to display a video of game content G supplied from a game machine 500 via the image processing apparatus 1.

In the case of this example, when a characteristic scene of the contents C displayed on the sub-screens 22 is detected, as shown in B in FIG. 32, the display on the main screen 21 is switched from the video of the game content G to a video of the content C (the content Cb) in which the characteristic scene is detected.

Consequently, it is also possible to appropriately provide a user using a game in the game machine 500 with a climax scene of the contents C.

In the example shown in FIG. 32, the video of one game content G is displayed. However, it is also possible to display videos of plural game contents G on the main screen 21.

Figure 33:
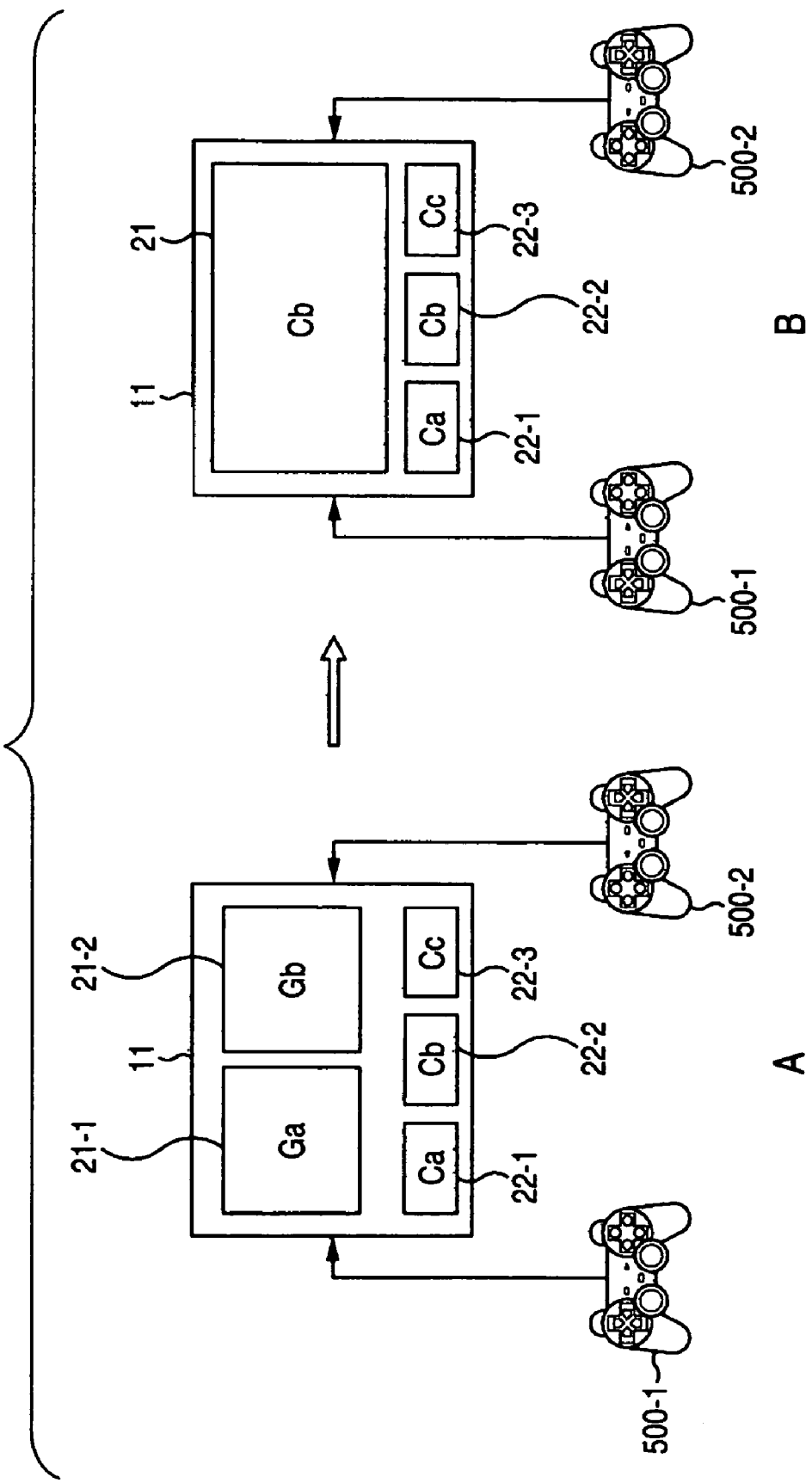
FIG. 33 is a diagram showing still another example of display on the displaying unit 11 of the TV 2 in FIG. 1.

For example, as shown in A in FIG. 33, it is possible to connect two game machines 500 to the image processing apparatus 1 and display videos of the game contents G of the game machines 500 on two main screens 21-1 and 21-2, respectively.

In the case of this example, when a characteristic scene is detected from the contents C displayed on the sub-screens 22, as shown in B in FIG. 33, the two main screens 21 are reconstituted into one main screen 21. When the content C (the content Cb) in which the characteristic scene is detected is displayed on the reconstituted screen, or when a climax ends, as shown in A in FIG. 33, the main screen 21 is reconstituted into the two main screens 21 again. The videos of the original game contents G are displayed on the main screens 21.

Figure 34:
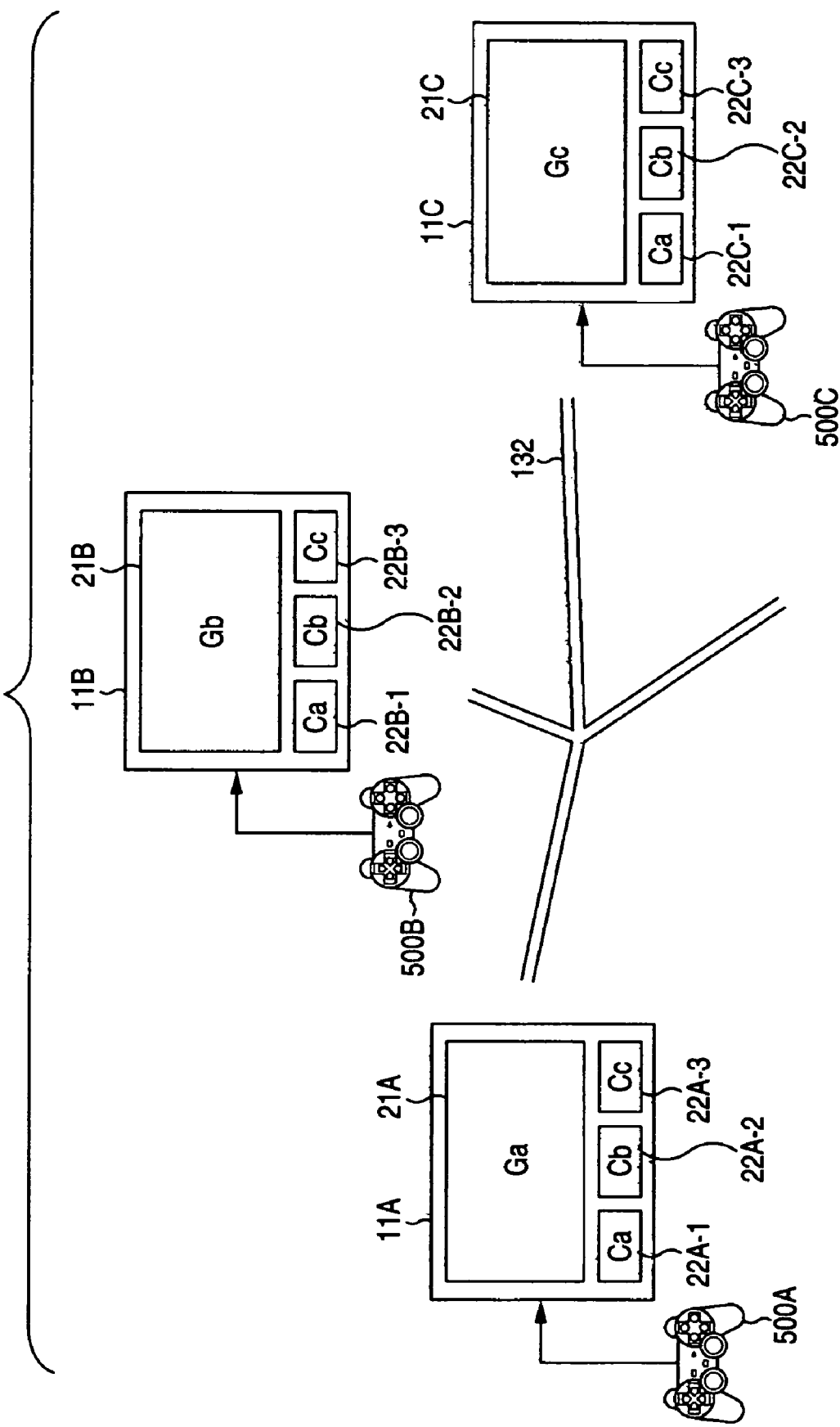
FIG. 34 is a diagram showing still another example of display on the displaying unit 11 of the TV 2 in FIG. 1.

As shown in FIG. 34, it is also possible to perform the similar display switching in plural image processing apparatuses 1 connected via the Internet 132.

Figure 35:
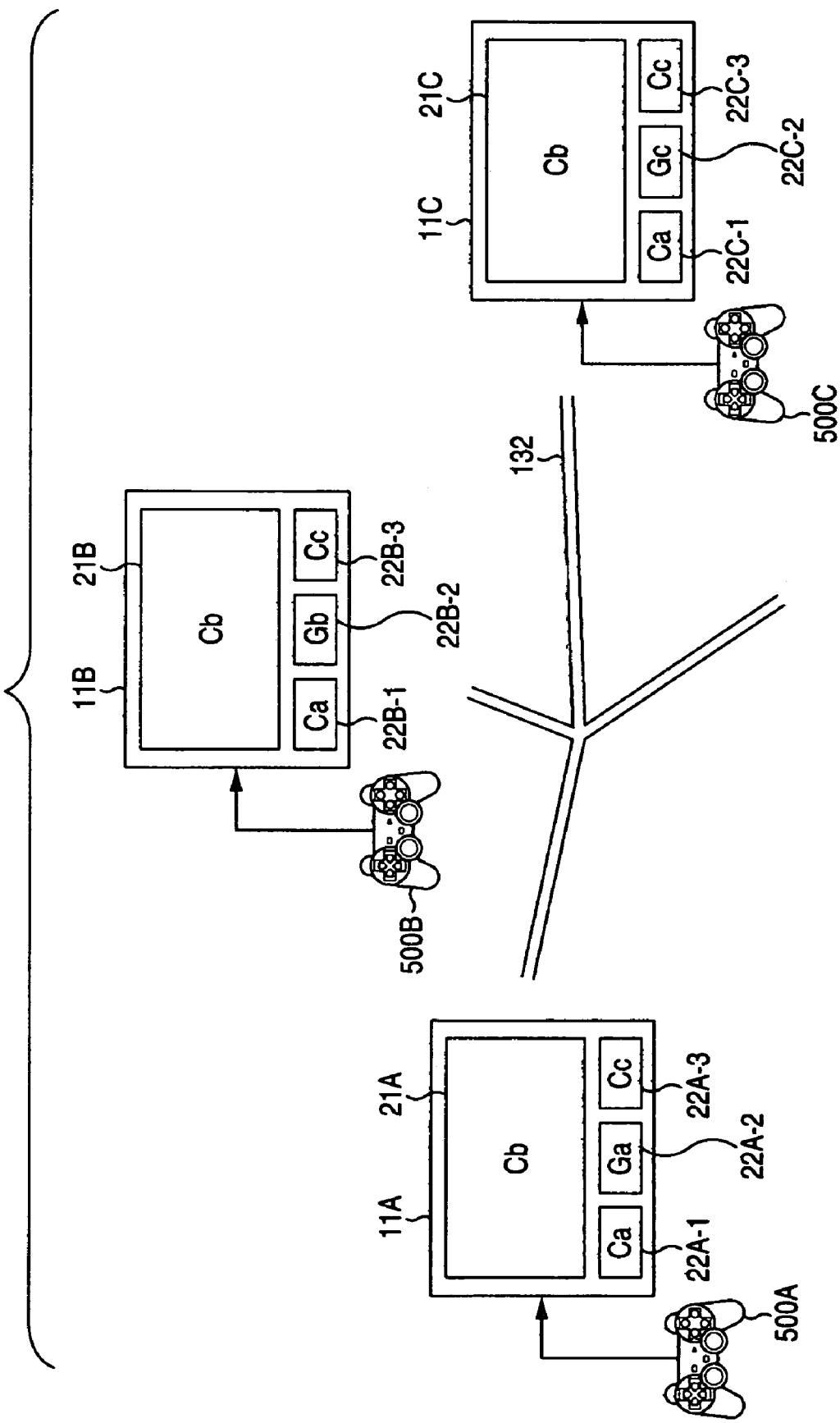
FIG. 35 is a diagram showing still another example of display on the displaying unit 11 of the TV 2 in FIG. 1.

In the case of this example, when a characteristic scene is detected from the contents C displayed on the sub-screens 22 of the displaying units 11 of the respective TVs 2, as shown in FIG. 35, displays on the respective main screens 21 are simultaneously switched from videos of the game contents G to videos of the content C (the content Cb) in which the characteristic scene is detected.

In the above description, sound of content is not referred to. However, it is also possible to output sounds of all the contents C displayed on the main screen 21 and the sub-screens 22 at a fixed volume from the speaker 12 and, when the display on the main screen 21 is switched, sound of the content C displayed on the main screen 21 is outputted at a volume higher than a volume of the other contents.

Figure 36:
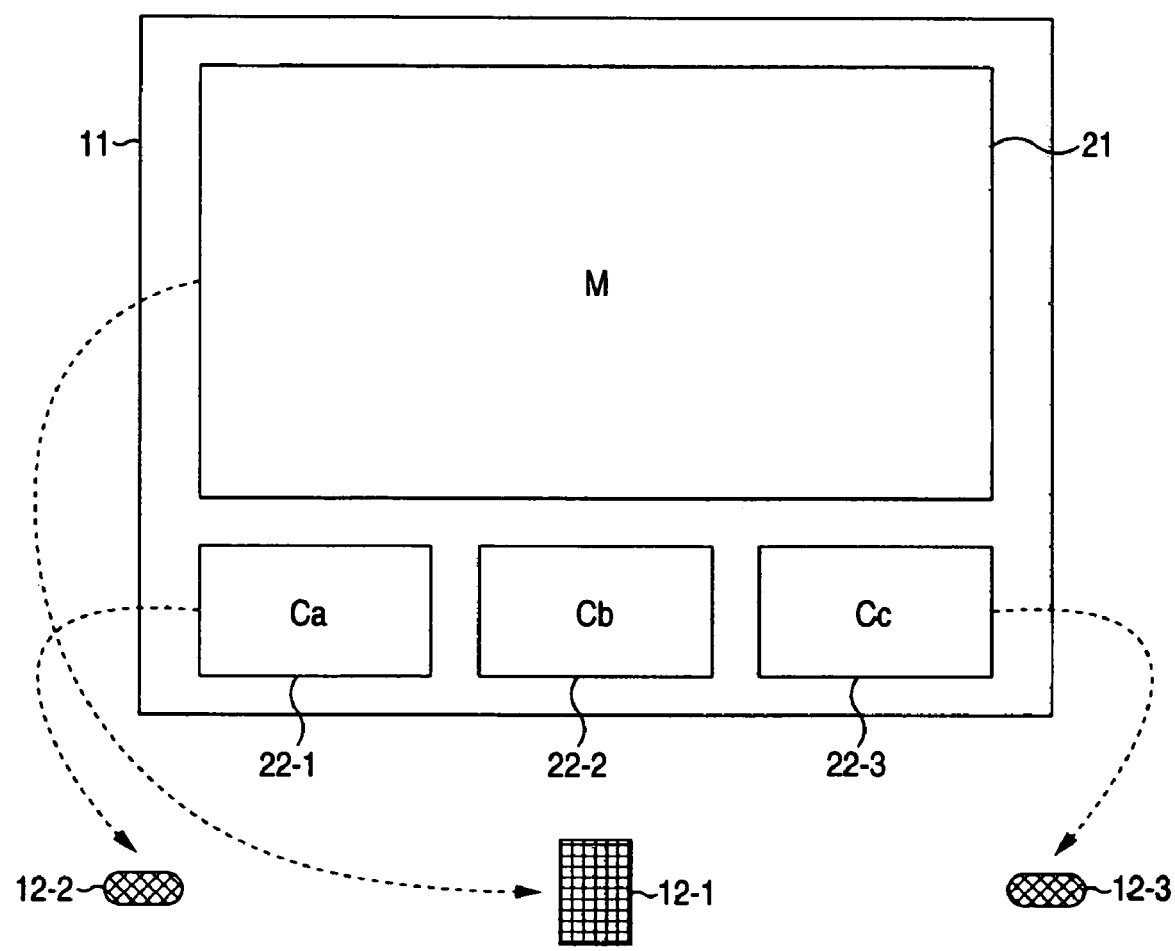
FIG. 36 is a diagram showing still another example of display on the displaying unit 11 of the TV 2 in FIG. 1.
Figure 37:
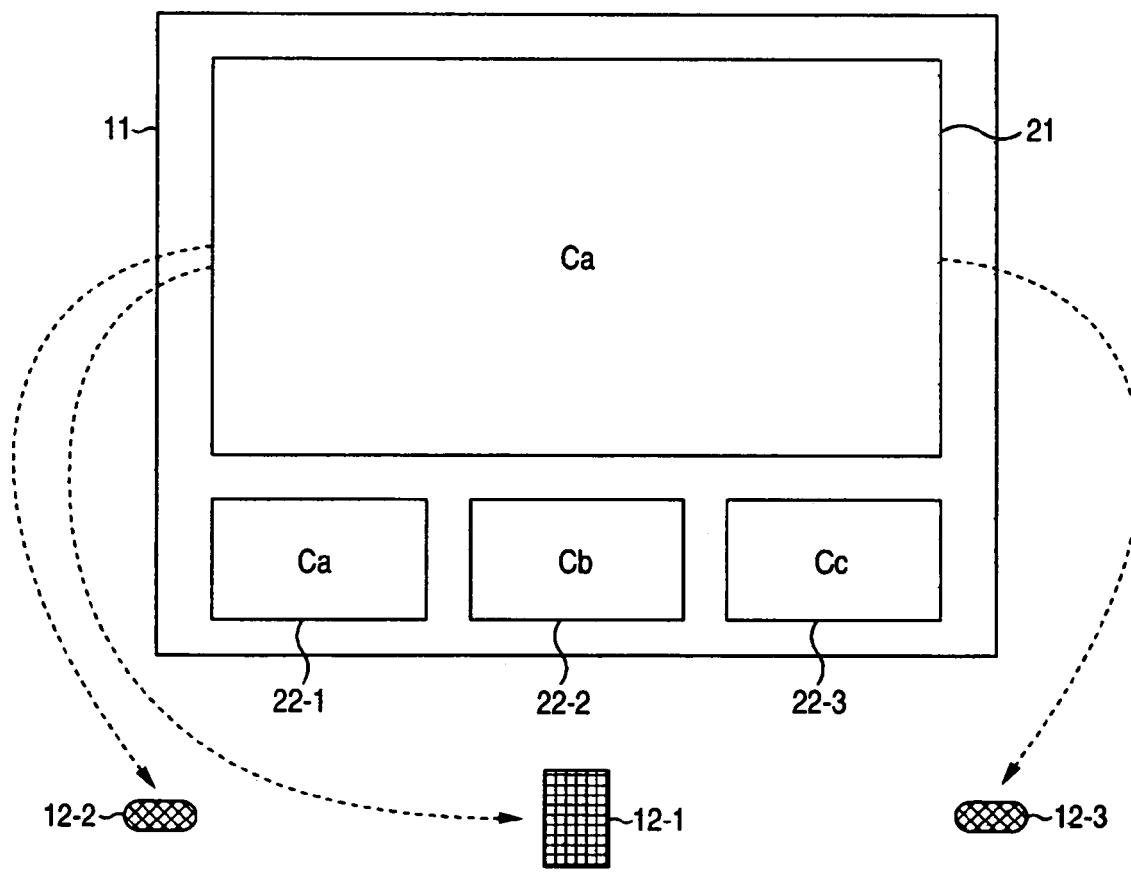
FIG. 37 is a diagram showing still another example of display on the displaying unit 11 of the TV 2 in FIG. 1.

Further, as shown in FIG. 36, it is also possible to output sound of the content C displayed on the main screen 21 from a speaker 12-1, output sound of the content C displayed on the sub-screen 22-1 from a speaker 12-2, and output sound of the content C displayed on the sub-screen 22-3 from a speaker 12-3 and, for example, when a characteristic scene is detected from the content Ca, as shown in FIG. 37, switch the display on the main screen 21 to a video of the content Ca and output sound of the content Ca from all the speakers 12.

In FIGS. 36 and 37, only the speakers 12 selected for convenience of explanation are shown.

The multi-screen display in the above explanation may be performed from the usual single screen display as required. In other words, a user may perform the multi-screen display as described above in response to a predetermined climax by selecting an operation mode of the multi-screen display using a predetermined operating unit such as a remote controller.

In the above description, the respective kinds of processing described above are executed independently in the image processing apparatus 1. However, for example, it is also possible to execute the processing by appropriately transmitting and receiving a predetermined software cell between the image processing apparatus 1 and a not-shown processing server connected to the image processing apparatus 1 by the Internet 132.

The series of processing described above can be executed by hardware or can be executed by software. When the series of processing is executed by software, a program constituting the software is installed in a computer built in dedicated hardware or, for example, a general-purpose personal computer capable of executing various functions by installing various programs.

A program recording medium that stores a program installed in a computer and brought into an executable state by the computer is constituted by a removable medium serving as a package medium including the memory card 135 shown in FIG. 5, a magnetic disk (including a flexible disk), an optical disk (including a compact disc-read only memory (CD-ROM) and a digital versatile disc (DVD)), or a magneto-optical disk, the ROM 103, the HD 118, or the like. Storage of the program in the program recording medium is performed using wire or wireless communication media such as a local area network, the Internet, and a digital satellite broadcast via a the SIO controller 115 serving as an interface of a router, a modem, and the like as required.

In this specification, steps describing the program stored in the program recording medium includes not only processing performed in time series according to a described order but also processing executed in parallel or individually, although not always performed in time series.

Embodiments of the invention are not limited to the embodiments described above. Various modifications of the invention are possible without departing from the spirit of the invention.

The invention claimed is:

1. An image processing apparatus that can display a predetermined content as a predetermined main screen or predetermined sub-screens, comprising:
   displaying means for displaying a main-content on the main screen and sub-contents on the sub-screens;
   detecting means for detecting characteristic amounts of the sub-contents displayed on the sub-screens, in which the characteristic amounts of the sub-contents pertain to a predetermined sound or image; and control means for switching the display on the main screen based on the characteristic amounts of the sub-contents detected by the detecting means.

2. An image processing apparatus according to claim 1, wherein, when the characteristic amounts of the sub-contents exceed a predetermined threshold, the control means displays the sub-contents instead of the main content.

3. An image processing apparatus according to claim 2, wherein the control means returns the display on the main screen to the main content when a predetermined condition is satisfied.

4. An image processing apparatus according to claim 2, wherein the control means limits switching of the display on the main screen until a characteristic state of the sub-contents displayed on the main screen ends.

5. An image processing apparatus according to claim 2, wherein the control means reverses and displays a video of the sub-contents on the main screen.

6. An image processing apparatus according to claim 2, further comprising recording means for recording the sub-contents displayed on the sub-screens.

7. An image processing apparatus according to claim 1, wherein the main content is a broadcast program or game content.

8. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens; and control means for switching the display on the main screen based on the characteristic amounts of the sub-contents detected by the detecting means, wherein, when the characteristic amounts of the sub-contents exceed a predetermined threshold, the control means displays the sub-contents instead of the main content, wherein the control means returns the display on the main screen to the main content when a predetermined condition is satisfied, and wherein the control means includes reproducing means for reproducing the main content, and when reproduction of the main content is stopped and an end time of the main content is determined, the reproducing means reproduces the main content such that the reproduction is completed by the end time.

9. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens; and control means for switching the display on the main screen based on the characteristic amounts of the sub-contents detected by the detecting means, wherein, when the characteristic amounts of the sub-contents exceed a predetermined threshold, the control means displays the sub-contents instead of the main content, and wherein, when the characteristic amounts of the sub-contents exceed the predetermined threshold, the control means displays the sub-contents from a scene a predetermined time earlier than a scene in which the characteristic amounts of the sub-contents exceeding the predetermined threshold is detected.

10. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens; and control means for switching the display on the main screen based on the characteristic amounts of the sub-contents detected by the detecting means, wherein, when the characteristic amounts of the sub-contents exceed a predetermined threshold, the control means displays the sub-contents instead of the main content, and wherein, when the characteristic amounts of the sub-contents exceeding the predetermined threshold are simultaneously detected from plural sub-contents, the control means displays all or a part of the plural sub-contents on the main screen.

11. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens; and control means for switching the display on the main screen based on the characteristic amounts of the sub-contents detected by the detecting means, wherein, when the characteristic amounts of the sub-contents exceed a predetermined threshold, the control means displays the sub-contents instead of the main content, and wherein the control means changes the display of the sub-contents displayed on the main screen according to a transition of the characteristic amounts.

12. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens; and control means for switching the display on the main screen based on the characteristic amounts of the sub-contents detected by the detecting means, wherein the characteristic amounts are volumes of sounds or magnitudes of sound signals at a predetermined frequency of the sub-contents or degrees of matching of videos of the sub-contents and a predetermined image.

13. An image processing apparatus that can display a predetermined content as a predetermined main screen or predetermined sub-screens, comprising:

displaying means for displaying a main-content on the main screen and sub-contents on the sub-screens;

detecting means for detecting characteristic amounts of the sub-contents displayed on the sub-screens;

control means for switching the display on the main screen based on the characteristic amounts of the sub-contents detected by the detecting means; and sound outputting means for outputting sound of the main content displayed on the main screen and sounds of the sub-contents displayed on the sub-screens, wherein the control means controls the sound outputting means based on the characteristic amounts of the sub-contents detected by the detecting means.

14. An image processing apparatus that can display a predetermined content as a predetermined main screen or predetermined sub-screens, comprising:
a displaying unit operable to display a main-content on the main screen and sub-contents on the sub-screens;
a detecting unit operable to detect characteristic amounts of the sub-contents displayed on the sub-screens, in which the characteristic amounts of the sub-contents pertain to a predetermined sound or image; and
a control unit operable to switch the display on the main screen based on the characteristic amounts of the sub-contents detected by the detecting unit.

15. An image processing method that can display a predetermined content as a predetermined main screen or predetermined sub-screens, the method comprising:
displaying a main content on the main screen and sub-contents on the sub-screens;
detecting characteristic amounts of the sub-contents displayed on the sub-screens, in which the characteristic amounts of the sub-contents pertain to a predetermined sound or image; and
switching the display on the main screen based on the characteristic amounts of the sub-contents detected.

16. A computer readable medium having stored therein a program for displaying a predetermined content on a predetermined main screen or predetermined sub-screens, the program causing a computer to execute a process comprising:
displaying a main content on the main screen and sub-contents on the sub-screens;
detecting characteristic amounts of the sub-contents displayed on the sub-screens, in which the characteristic amounts of the sub-contents pertain to a predetermined sound or image; and
switching the display on the main screen based on the characteristic amounts of the sub-contents detected.

* * * * *